(12) United States Patent
Kasahara

(10) Patent No.: US 8,285,644 B2
(45) Date of Patent: Oct. 9, 2012

(54) IMAGE PROCESSING APPARATUS, CONTROL METHOD THEREFOR, AND COMPUTER-READABLE STORAGE MEDIUM

(75) Inventor: Kimito Kasahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 996 days.

(21) Appl. No.: 12/242,480

(22) Filed: Sep. 30, 2008

(65) Prior Publication Data

US 2009/0097698 A1 Apr. 16, 2009

(30) Foreign Application Priority Data

Oct. 2, 2007 (JP) ................................ 2007-258694

(51) Int. Cl.
*G06F 21/00* (2006.01)
(52) U.S. Cl. ............... 705/51; 705/54; 705/57; 705/902
(58) Field of Classification Search ...................... 705/51
See application file for complete search history.

(56) References Cited

U.S. PATENT DOCUMENTS

2004/0190782 A1* 9/2004 Nomizu et al. ............... 382/232
2006/0218643 A1* 9/2006 DeYoung ........................ 726/26

FOREIGN PATENT DOCUMENTS

| JP | 07-115537 A | 5/1995 |
|---|---|---|
| JP | 2004-192610 A | 7/2004 |
| JP | 2006-211027 A | 8/2006 |
| JP | 2006-352284 A | 12/2006 |

OTHER PUBLICATIONS

"Enterprise DRM", www.documentti.com, all pages, date unknown. http://www.documentti.com/index.php?option=com_content&view=article&id=85&Itemid=157.*

* cited by examiner

*Primary Examiner* — James A Reagan
*Assistant Examiner* — Calvin Cheung
(74) *Attorney, Agent, or Firm* — Carter, DeLuca, Farrell & Schmidt LLP

(57) ABSTRACT

An image processing apparatus which is capable of easily determining, when a user causes the apparatus to scan a sheet original to carry out predetermined processing, whether or not the sheet original has been modified or edited from a document file as the source of the sheet original. A scanner section not only reads an original and generates original image data, but also recognizes information embedded in the original. Rights information concerning the original is acquired based on the information embedded in the original. A controller unit determines whether or not the original has been edited, and performs control based on contents of the rights information and a result of the determination, such that execution of processing, which is designated by a user, on the original image data is permitted or restricted.

11 Claims, 19 Drawing Sheets

FIG. 14A

| DOCUMENT ID | CONTROL INFORMATION ID |
|---|---|
| xxxx | AAAA |
| yyyy | BBBB |
| yyyy_2 | CCCC |
| zzzz | AAAA |

| CONTROL INFORMATION ID | USER ID | RIGHTS INFORMATION | | | VALIDITY PERIOD | |
|---|---|---|---|---|---|---|
| | | DISPLAY | EDIT | PRINTING | START | END |
| AAAA | 0001 | ○ | × | × | 2004/04/01 | 2005/03/31 |
| | 0002 | ○ | ○ | ○ | 2004/04/01 | 2005/03/31 |
| | 0003 | ○ | × | × | 2004/04/01 | 2004/06/30 |
| BBBB | 0001 | ○ | × | × | 2004/04/01 | 2005/03/31 |
| | 0002 | ○ | ○ | ○ | 2004/04/01 | 2005/03/31 |
| | 0003 | ○ | × | ○ | 2004/04/01 | 2005/03/31 |
| | 0004 | ○ | ○ | ○ | 2004/04/01 | 2005/01/31 |

*FIG. 17*

```
<embeddedInfo>
    <print>
        <size="A4/">
        <type="color"/>
    </print>
    <originalDocument>
        <author name="KATO Taro"/>
        <createTime="2006/12/19"/>
        <type="pdf"/>
        <size="11035"/>
        <url="http://www.somedomain.co.jp/private/doc1">
    </originalDocument>
</embeddedInfo>
```

IMAGE PROCESSING APPARATUS, CONTROL METHOD THEREFOR, AND COMPUTER-READABLE STORAGE MEDIUM

BACKGROUND OF THE INVENTION

1. Field of the Invention

The present invention relates to an image processing apparatus adapted to read information from an original having the information embedded therein and perform predetermined processing, a control method therefor, and a computer-readable storage medium storing a program for implementing the control method.

2. Description of the Related Art

Conventionally, there has been known a technique for controlling the operation of an image forming apparatus based on information contained in an original and information on the user of the image forming apparatus. For example, an image forming apparatus has been proposed in which identification information read from an original is sent to a server so as to acquire the attributes of the original, and the operation of the image forming apparatus is controlled based on the acquired attributes (see e.g. Japanese Patent Laid-Open Publication No. 2004-192610).

Further, a similar technique has been proposed in which when an image is read from an original, copying inhibition information is detected from the original, and an input operator code is checked to see if the operator is permitted to perform copying of the original, whereafter if the operator is permitted to perform copying of the original, copying is executed (see e.g. Japanese Patent Laid-Open Publication No. H07-115537).

In the above-mentioned prior art, however, even when a sheet original to be processed by the image forming apparatus has been modified from electronic data as the source of the sheet original, the image forming apparatus is permitted to carry out predetermined processing on the sheet original, which can cause a problem in some cases.

For example, assuming that a user authorized to print the sheet original but unauthorized to edit the same causes the image forming apparatus to scan the sheet original and perform the processing, it is necessary to change the processing depending on whether or not the sheet original has been edited.

Let it be assumed, by way of example, that a user A who printed form data passes the printed form data to a user B, and the user A is authorized to edit and print the form data while the user B is authorized to print the form data but unauthorized to edit the same. That is, the user B is not authorized to edit the form data, and hence the user B is not permitted to add or change numerals in the form data.

In such a case, however, the above-mentioned prior art allows the user B to print out a form, based on the printing rights granted to the user B, and then modify the printed form itself and generate a document file (electronic data) of the modified form using the image forming apparatus. This makes it possible to generate form data as if by editing the form data as the source of the printed form. For another example, a person unauthorized to approve purchase orders of articles can place a false stamp of approval on a purchase order and change the modified purchase order into electronic data using the image forming apparatus.

To prevent such forgery as mentioned above, it is necessary to determine not only whether or not a user is granted edit rights, but also whether or not a sheet original used by the user has been edited from a document file (electronic data) as the source of the sheet original. Therefore, the above-described prior art is incapable of solving the problem.

SUMMARY OF THE INVENTION

The present invention provides an image processing apparatus which is capable of easily determining, when a user causes the apparatus to scan a sheet original to carry out predetermined processing, whether or not the sheet original has been modified or edited from a document file as the source of the sheet original, to thereby improve security, a control method therefor, and a computer-readable storage medium storing a program for implementing the control method.

In a first aspect of the present invention, there is provided an image processing apparatus comprising an original reading unit adapted to read an original to generate original image data, and recognize information embedded in the original, a rights information acquisition unit adapted to acquire rights information concerning the original based on the information embedded in the original, and a control unit adapted to perform control based on contents of the rights information concerning the original acquired by the rights information acquisition unit, and whether or not the original has been modified, such that execution of processing designated by a user on the original image data is permitted or restricted.

In a second aspect of the present invention, there is provided an image processing apparatus comprising an original reading unit adapted to read an original to generate original image data, and recognize information embedded in the original, a rights information acquisition unit adapted to acquire rights information concerning the original based on the information embedded in the original, a judgment unit adapted to judge whether or not the original has been edited, a definition unit adapted to define processing that can be executed when it is determined that the scanned original has not been edited and processing that can be executed when it is determined that the scanned original has been edited, and a control unit adapted to perform control such that one of the defined processings is permitted according to a result of determination performed by the judgment unit.

In a third aspect of the present invention, there is provided a control method for an image processing apparatus, comprising reading an original to generate original image data, and recognizing information embedded in the original; acquiring rights information concerning the original based on the information embedded in the original; and performing control based on contents of the rights information concerning the original acquired in said acquiring, and whether or not the original has been modified, such that execution of processing designated by a user on the original image data is permitted or restricted.

In a fourth aspect of the present invention, there is provided a control method for an image processing apparatus, comprising reading an original to generate original image data, and recognizing information embedded in the original; acquiring rights information concerning the original based on the information embedded in the original; judging whether or not the original has been edited; defining processing that can be executed when it is determined that the scanned original has not been edited and processing that can be executed when it is determined that the scanned original has been edited; and performing control such that one of the defined processings is permitted according to a result of determination performed in said judging.

In a fifth aspect of the present invention, there is provided a computer-readable storage medium storing a program for causing a computer to execute a control method for an image processing apparatus, wherein the control method comprises reading an original to generate original image data, and recognizing information embedded in the original; acquiring rights information concerning the original based on the information embedded in the original; and performing control based on contents of the rights information concerning the original acquired in said acquiring, and whether or not the original has been modified, such that execution of processing designated by a user on the original image data is permitted or restricted.

In a sixth aspect of the present invention, there is provided a computer-readable storage medium storing a program for causing a computer to execute a control method for an image processing apparatus, wherein the control method comprises reading an original to generate original image data, and recognizing information embedded in the original; acquiring rights information concerning the original based on the information embedded in the original; judging whether or not the original has been edited; defining processing that can be executed when it is determined that the scanned original has not been edited and processing that can be executed when it is determined that the scanned original has been edited; and performing control such that one of the defined processings is permitted according to a result of determination performed in said judging.

According to the present invention, it is possible to easily determine, when a user causes the image processing apparatus to scan a sheet original to carry out predetermined processing, whether or not the sheet original has been modified or edited from a document file as the source of the sheet original, to thereby improve security.

The features and advantages of the invention will become more apparent from the following detailed description taken in conjunction with the accompanying drawings.

BRIEF DESCRIPTION OF THE DRAWINGS

FIG. 14A is a view of an access management table as an example of information managed by the access control management server.

FIG. 14B is a view of an access control information table as an example of information managed by the access control management server.

FIG. 17 is a view showing an example of data to be embedded which is converted into an XML format.

DETAILED DESCRIPTION OF THE EMBODIMENTS

The present invention will now be described in detail with reference to the drawings showing an embodiment thereof.

Figure 1:
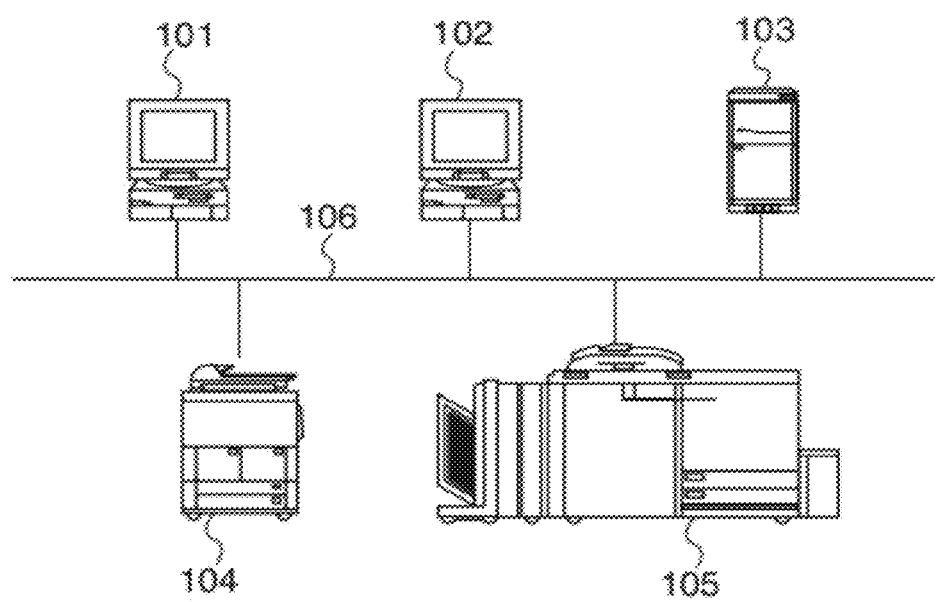
FIG. 1 is a diagram showing the general configuration of a system including an image processing apparatus according to an embodiment of the present invention.

FIG. 1 is a diagram showing the general configuration of a system including an image processing apparatus according to the embodiment of the present invention.

As shown in FIG. 1, the image processing apparatus 104 is connected to a personal computers (PCs) 101 and 102, an access control management server 103, and an image processing apparatus 105 via a network (LAN) 106 (or a public telephone line, not shown).

The image processing apparatus 104 is a multifunction machine equipped with various functions, such as a scanning function, a copying function, a facsimile function, and a box function. The image processing apparatus 104 is capable of scanning an image on a sheet original (hereinafter simply referred to as "an original") and copying the scanned image, and storing a document file (electronic data) of the scanned image in a storage device.

Further, the image processing apparatus 104 is capable of sending the document file stored in the storage device to a desired transmission destination, such as the PC 101, e.g. via the LAN 106. It should be noted that the transmission destination of a document file is not limited to the apparatuses appearing in FIG. 1, but a document file may be sent to any of various kinds of terminal apparatuses, a file server, a facsimile machine, or an Internet facsimile machine, which are connected to the LAN 106.

Figure 2:
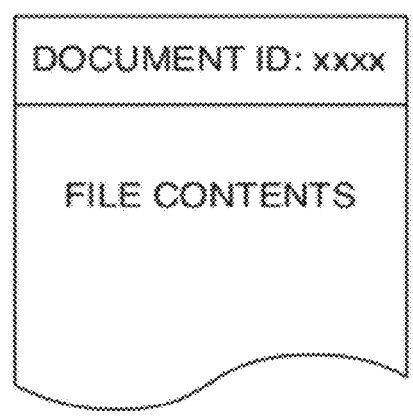
FIG. 2 is a view of an example of a document file generated from an application stored in the image processing apparatus or one of PCs appearing in FIG. 1.

The access control management server 103 has a function of communicating with the image processing apparatus 104 or any of the other apparatuses via the LAN 106, receiving a document ID and a user ID (user authentication information) from the apparatus, and sending rights information given to a user designated by the user ID. The document ID is a unique identifier (ID: identification data) embedded in a document file generated as the source of a sheet original by an application stored in the image processing apparatus 104 or the PC 101 or 102, such that the document file can be identified. FIG. 2 shows an example of a document file having a document ID embedded therein.

Although in the present embodiment, the access control management server 103 is used to control access to a document file, this is not limitative, but any other form of system configuration can be employed insofar as each apparatus (e.g. the image processing apparatus 104) can acquire rights information associated with a document file. For example, the image processing apparatuses 104 or 105 may incorporate the function of the access control management server 103.

Figure 3:
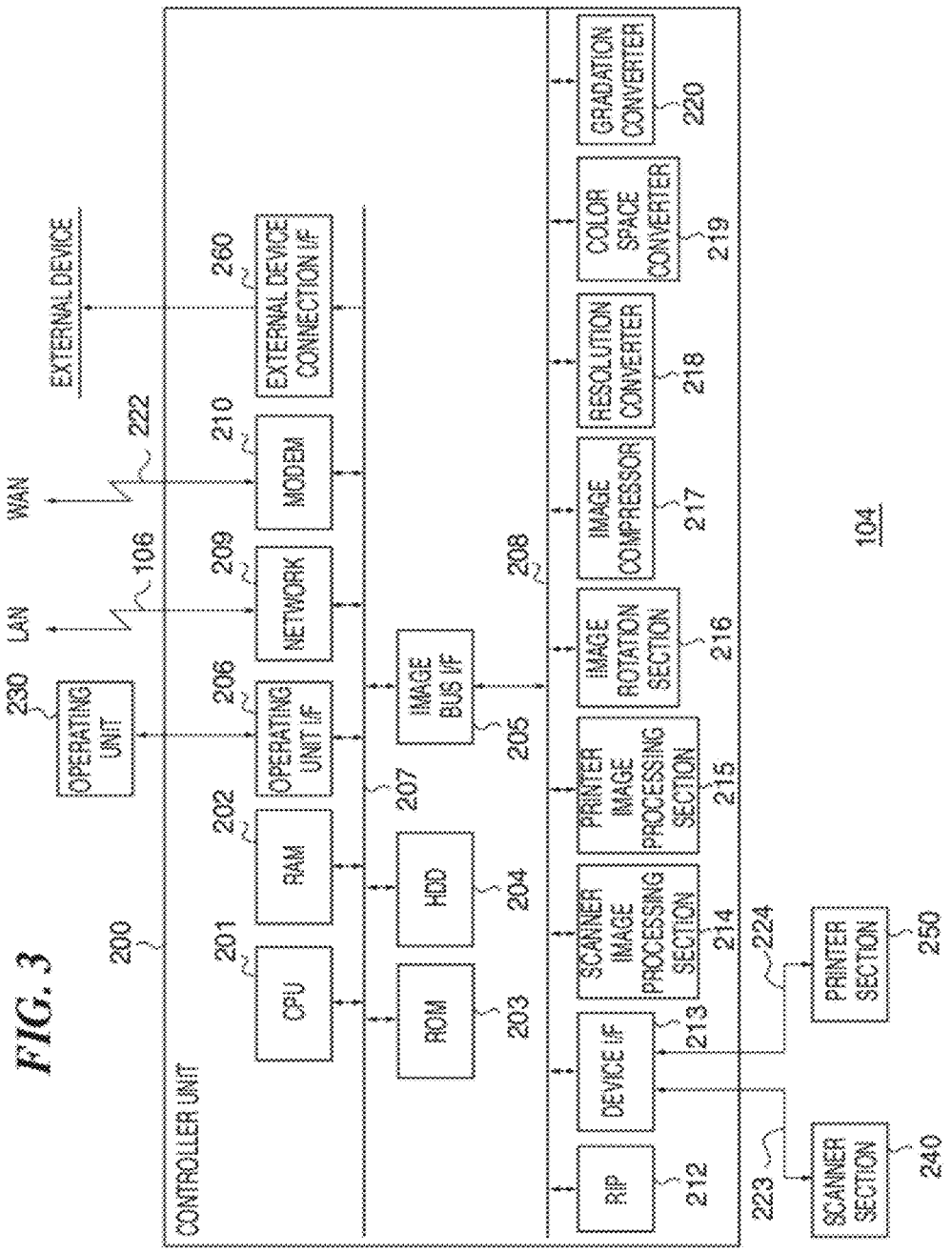
FIG. 3 is a block diagram showing the internal configuration of the image processing apparatus appearing in FIG. 1.

FIG. 3 is a block diagram showing the internal configuration of the image processing apparatus 104 appearing in FIG. 1.

As shown in FIG. 3, the image processing apparatus 104 is comprised of a controller unit 200, an operating unit 230, a scanner section 240 as an image input device, and a printer section 250 as an image output device. The controller unit 200 is connected to the scanner section 240 via an image inputting section interface 223, and is connected to the printer section 250 via a printer section interface 224. Further, the controller unit 200 is connected to the LAN 106 and a public telephone line (WAN) 222 outside the apparatus to input and output image information and device information.

A CPU 201 controls the overall operation of a system within the image processing apparatus 104. A RAM 202 is a system work memory used for the CPU 201 to operate. The RAM 202 also functions as an image memory for temporarily storing image data. A ROM 203 is a boot ROM, and stores a boot program for the system. An HDD 204 is a hard disk drive, and stores system software and image data.

An operating unit I/F 206 provides interface with the operating unit (UI: User Interface) 230, and outputs to the operating unit 230 information to be displayed on the same. The operating unit I/F 206 also plays the role of transferring information input by the user via the operating unit 230 to the CPU 201.

A network 209 is connected to the LAN 106, for the input and output of information. A modem 210 is connected to the WAN 222, for the input and output of image information and device information.

An external device connection I/F 260 provides interface with external devices used for expansion of the functions of the image processing apparatus 104. Although a USB (Universal Serial Bus) interface, for example, is known as a standard of interface for connection to external devices, the external device connection I/F 260 is implanted not limitatively by the USB interface, but any other standard may be used insofar as it enables connection to external devices. The above-mentioned devices are arranged on a system bus 207.

An image bus I/F 205 is a bus bridge that connects between the system bus 207 and an image bus 208 for high-speed transmission of image data, and at the same time converts the data structure of the image data. The image bus 208 is implemented by a PCI bus or an IEEE 1394 bus. On the image bus 208, there are arranged devices described below.

A raster image processor (RIP) 212 expands a PDL code into a bitmap image. A device I/F 213 is connected to the scanner section 240 and the printer section 250 to perform conversion of image data. A scanner image processing section 214 corrects, processes, and edits original image data (hereinafter simply referred to as "image data") input from the scanner section 240. Further, the scanner image processing section 214 has a function of determining whether the input image data is color or monochrome, based on a chroma signal of the image, and storing the result of the determination.

A printer image processing section 215 corrects, processes, and edits image data to be output. An image rotation section 216 is capable of cooperating with the scanner image processing section 214 to rotate an image scanned by the scanner section 240 as the scanned image is output from the scanner section 240, and storing the image in a memory, such as the RAM 202. Further, the image rotation section 216 is capable of rotating an image in the memory and storing the image in the same, or cooperating with the printer image processing section 215 to print out an image in the memory while rotating the same.

A resolution converter 218 performs resolution conversion on an image in the memory and stores the processed image in the memory again. A color space converter 219 converts a YUV image in the memory into a Lab image by matrix operation, for example, and stores the processed image in the memory again. A gradation converter 220 converts an 8-bit, 256-gradation image in the memory into a 1-bit, 2-gradation image e.g. by the error diffusion method and stores the processed image in the memory again. An image compressor 217 compresses or expands multi-valued image data by a JPEG format, and binary image data by a JBIG, MMR or MH format.

The image rotation section 216, the resolution converter 218, the color space converter 219, the gradation converter 220, and the image compressor 217 can operate in a cooperative manner. For example, in the case of rotating an image in the memory and converting the resolution of the same, the two operations can be performed without storing half-processed data using the memory.

It should be noted that the image processing apparatus 105 is identical in configuration to the image processing apparatus 104. Further, the PCs 101 and 102 are personal computers having hardware in a general configuration, and the access control management server 103 is a server computer having hardware in a general configuration. Therefore, description of the configurations of the image processing apparatus 105, the PCs 101 and 102, and the access control management server 103 is omitted.

Figure 4:
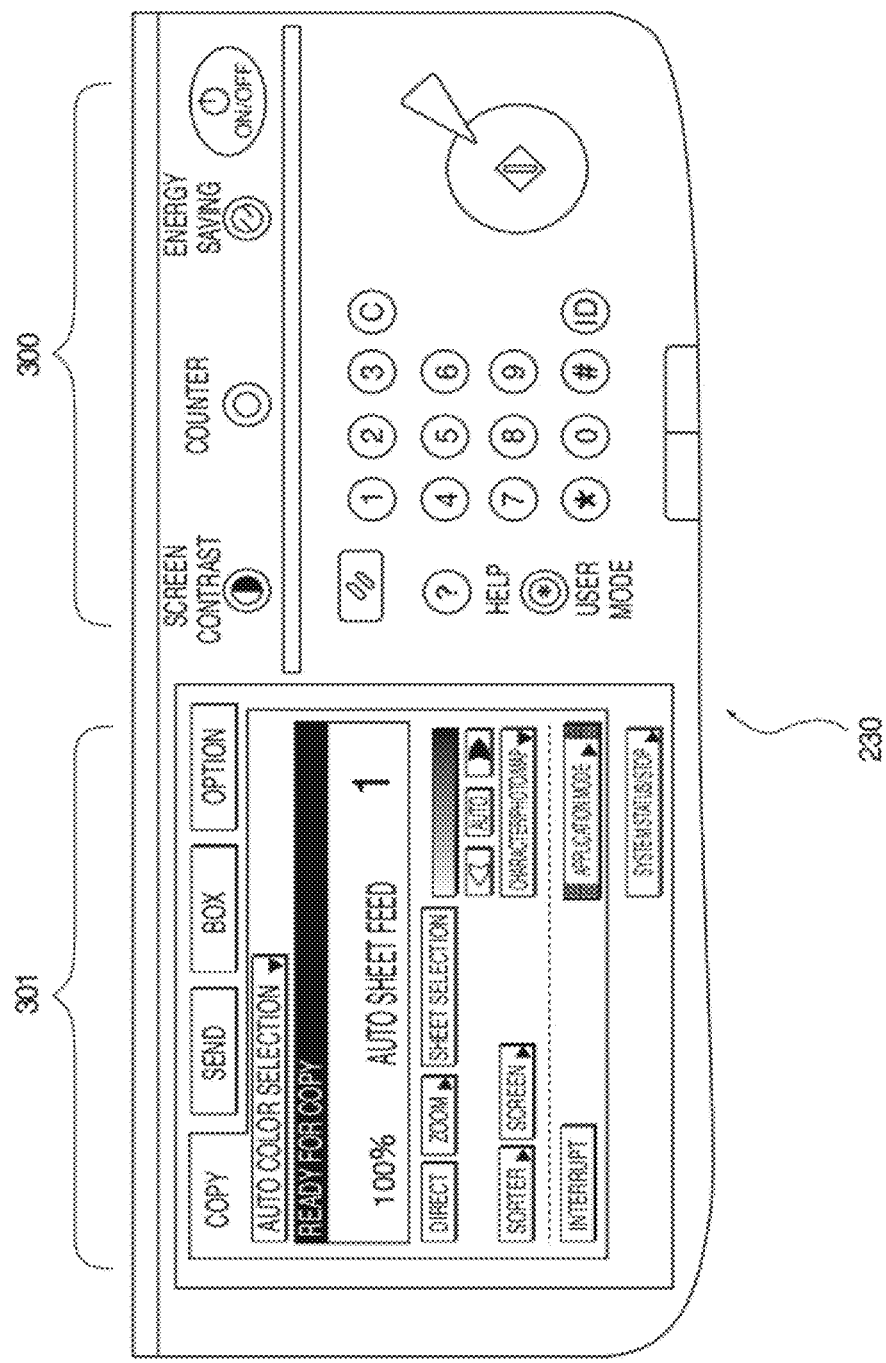
FIG. 4 is a view showing the appearance of an operating unit appearing in FIG. 3.
Figure 5:
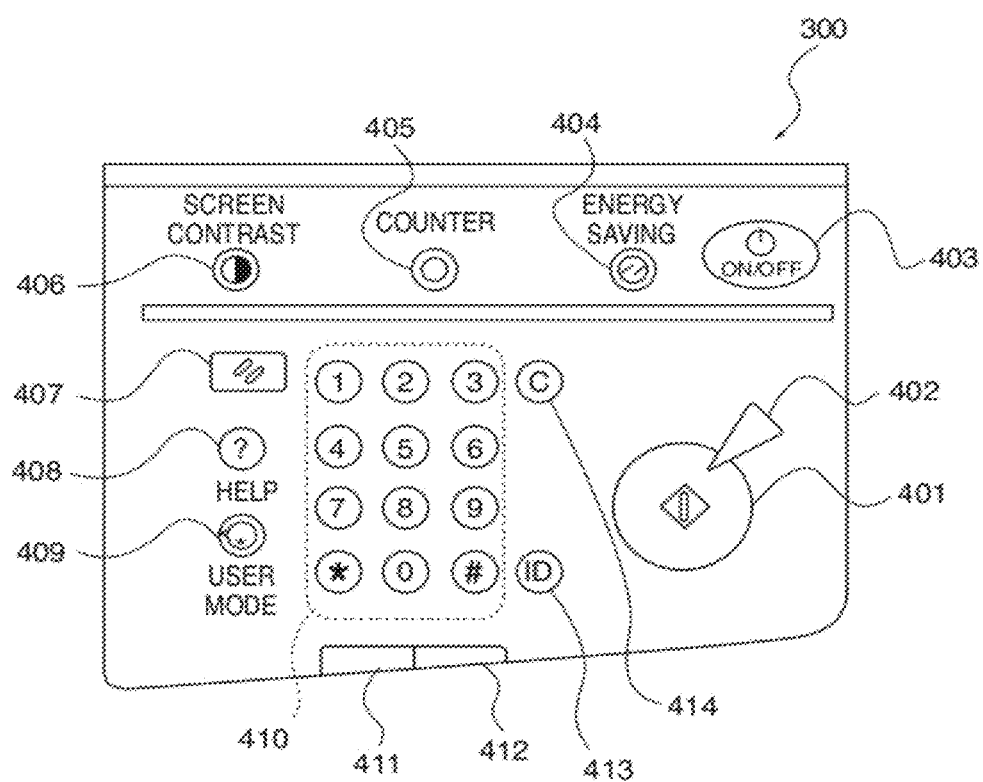
FIG. 5 is a view of a key input section on the operating unit shown in FIG. 4.
Figure 6:
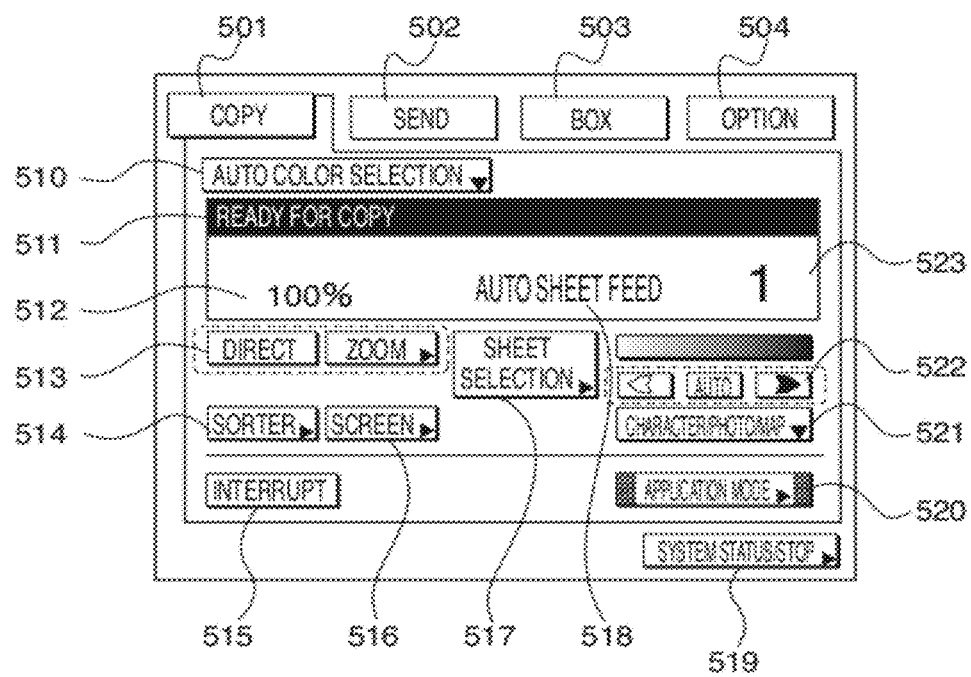
FIG. 6 is a view of a touch panel section on the operating unit shown in FIG. 4.

FIG. 4 is a view showing the appearance of the operating unit 230 appearing in FIG. 3. FIG. 5 is a view of a key input section on the operating unit 230 shown in FIG. 4, and FIG. 6 is a view of a touch panel section on the same.

As shown in FIG. 4, the operating unit 230 is comprised of the key input section 300 and the touch panel section 301. The key input section 300 enables key input for operation and configuration.

Referring to FIG. 5, a start key 401 is used to give an instruction for starting a copying operation, a transmission operation, or the like. A stop key 402 is used to stop an operation started in response to the instruction given via the start key 401. An operating unit power supply switch 403 is used to switch the image processing apparatus 104 between a standby mode and a sleep mode. The switch 403 can be used when a main power supply switch (not shown) is in its ON state. The standby mode is a normal operation state, while the sleep mode is a state awaiting an interrupt, such as a reception of a network print job or a reception of a facsimile transmission. In the sleep mode, programs are held in stoppage so as to reduce power consumption.

An energy-saving key 404 is used to lower the control temperature of a fixing device (not shown) in the image processing apparatus 104 in the standby mode so as to reduce power consumption. The control temperature can also be lowered by setting a power saving rate. A counter confirmation key 405 is used to display a selected one of delivered sheet counts stored in a software counter for counting printed sheets. By pressing the counter confirmation key 405, it is possible to display a delivered sheet count according to each operation mode (copying, printing, scanning, or facsimile), or according to each color mode (color or monochrome), or according to a sheet size (large or small). An image contrast dial 406 is used to adjust screen visibility e.g. by controlling a backlight for a liquid crystal display of the touch panel section 301.

A reset key 407 is used to nullify a configuration and return the configuration to its default state. A help key 408 is used to display a guidance screen or a help screen. A user mode key 409 is used to shift to a user-specific system configuration screen. Ten keys 410 are used to enter numerals for various configurations, and a clear key 414 is used to cancel the entry of the numerals.

An execution/memory lamp 411 flashes on and off during job execution or memory access to thereby notify the user that a job is being executed or that the memory is being accessed. An error lamp 412 flashes on and off e.g. when a serviceman call error occurs or when an operator call occurs to announce occurrence of paper jamming, running-out of consumables, or the like, to thereby notify the user that the job execution is impossible.

An ID key 413 is used by the user of the image processing apparatus 104 to enter the user ID for user authentication.

Referring to FIG. 6, the touch panel section 301 is implemented by a touch panel display comprised of an LCD (Liquid Crystal Display) and transparent electrodes laminated on the LCD. The touch panel section 301 is pre-programmed to be operable when a portion of the transparent electrodes corresponding to a key displayed on the LCD is touched by a finger, to detect the touch and perform an operation, such as displaying of another operation screen, according to the detected touch. FIG. 6 shows a state of the touch panel section 301 displaying an initial screen in the standby mode. The touch panel section 301 is capable of displaying various operation screens in response to respective user operations.

A copy tab 501 is used to perform transition to an operation screen for a copying operation. A send tab 502 is used to perform transition to an operation screen for giving an instruction for a data send operation, such as a facsimile send operation or an E-mail send operation. A box tab 503 is used to perform transition to a screen for inputting/outputting a job to/from a box (storage means for storing jobs on a user-by-user basis). An option tab 504 is used to perform transition to a screen for configuring various extension functions including the scanning function.

A color selection/setting key 510 is used to pre-select one of a color copying mode, a monochrome copying mode, and an automatic selection mode. A state display section 511 is used to display a state, such as a standby state, a warming-up state, occurrence of jamming, or occurrence of an error, of the image processing apparatus 104 in a simplified fashion. A magnification display section 512 is used to display a magnification set by a magnification setting key 513. The magnification setting key 513 is used to set a magnification, such as 100% magnification, an enlargement ratio, or a reduction ratio. A post-processing configuration key 514 is used to perform transition to a screen for setting whether or not to carry out stapling or punching, the number of staples or punches, and stapling positions or punching positions, and so forth.

An interrupt key 515 is operated to cause another job to interrupt a copying operation. A double-sided printing-setting key 516 is used to select one of double-sided printing and one-sided printing. A sheet size-setting key 517 is used to perform transition to a screen for selecting a sheet cassette, a sheet size, and a media type. A sheet size display section 518 is used to display a sheet size set by the sheet size-setting key 517 or an automatic sheet selection mode. A system monitor key 519 is used to display the status and conditions of the image processing apparatus. By selecting one of the tab keys 501 to 504, it is possible to switch to an operation mode corresponding to the selected tab key.

An application mode key 520 is used to perform transition to a screen for carrying out various kinds of image processing, such as duplex-to-duplex copy, cover/interleaved sheet setting, reduced layout, and image shift, and configuring a layout. An image mode-setting key 521 is used to select one of a character mode, a photograph mode, and so forth, as an image mode suited to an original image. A density setting key 522 is used to adjust the density of an image to be printed out. A sheet count display section 523 is used to display a sheet count designated by the ten keys 410 or the number of sheets having been printed during a current printing operation.

Figure 7:
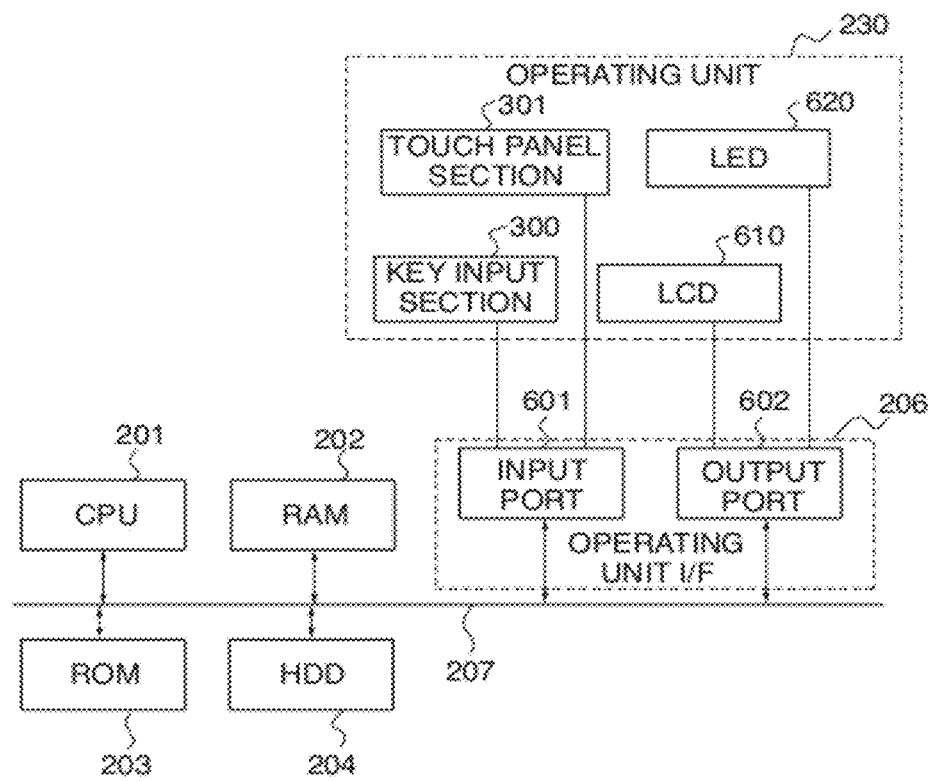
FIG. 7 is a block diagram schematically showing the internal configuration of the operating unit shown in FIG. 4 and an operating unit I/F appearing in FIG. 3.

FIG. 7 is a block diagram schematically showing the internal configuration of the operating unit 230 and the operating unit I/F 206.

The key input section 300 and the touch panel section 301 of the operating unit 230 are connected to the system bus 207 via an input port 601 of the operating unit I/F 206. Further, the operating unit 230 includes a display 610 implemented e.g. by an LCD or a CRT (Cathode Ray Tube) and an indicator 620 implemented e.g. by a LED (Light Emitting Diode). The display 610 and the indicator 620 are connected to the system bus 207 via an output port 602 of the operating unit I/F 206.

The CPU 201 performs overall control of access to various devices connected to the system bus 207, based on a control program stored in the ROM 203. The CPU 201 outputs image data of an original scanned by the scanner section 240 to the printer section 250, as an image signal. The output port 602 controls a screen output device.

The key input section 300 and the touch panel section 301 accept an operation input from the user, and the CPU 201 acquires the operation input via the operating unit I/F 206. The CPU 201 generates display screen data based on the acquired operation input and the above-mentioned control program, and outputs the generated display screen data to the display 610 via the output port 602.

Figure 8:
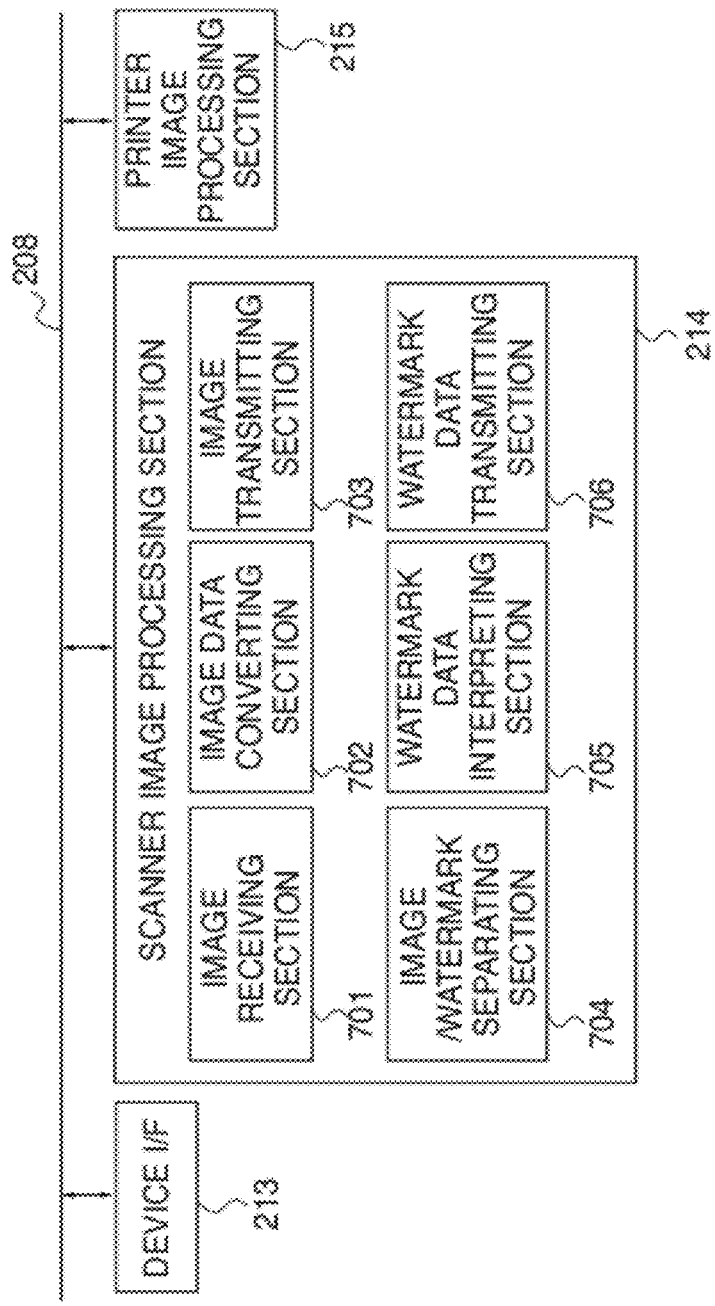
FIG. 8 is a block diagram showing the internal configuration of a scanner image processing section appearing in FIG. 3.

FIG. 8 is a block diagram showing the internal configuration of the scanner image processing section 214 appearing in FIG. 3.

The scanner image processing section 214 is configured to be capable of reading an electronic watermark (hereinafter simply referred to as a "watermark"). Watermarking is a technique to perform predetermined processing on image data or audio data to thereby secretly embed information invisible or inaudible to humans in the data.

The scanner image processing section 214 includes an image receiving section 701 for receiving image data from the device I/F 213 and an image data converting section 702 for converting the received image data into a form easy to be processed e.g. by the printer image processing section 215. Further, the scanner image processing section 214 includes an image transmitting section 703 for transmitting data to the printer image processing section 215 and an image/watermark separating section 704 for carrying out processing for separation between image data and a watermark when the image data has the watermark embedded therein.

Furthermore, the scanner image processing section 214 includes a watermark data interpreting section 705 for carrying out processing for interpreting the image data of watermark separated by the image/watermark separating section 704 and recognizing the image data as significant data. The scanner image processing section 214 also includes a watermark data transmitting section 706 that transmits data processed by the watermark data interpreting section 705 to another processing section when the data is to be used by the processing section.

These processing sections make it possible to process image data sent from the device I/F 213 into data which can be processed by the scanner image processing section 214 and image processing sections downstream of the scanner image processing section 214, and make it possible to extract data embedded as a watermark, if required.

Although in the present embodiment, the image processing apparatus 104 reads information, such as a document ID, embedded as a watermark in an original, and acquires rights information concerning output and editing of the original, the method of embedding information in an original is not limited to the watermark technique using an invisible watermark. For example, there have been proposed a method using a visible two-dimensional barcode, a method of embedding information utilizing changes in spacing between adjacent character lines, a method of embedding information in a halftone image, etc, but no particular method is limitatively used in the present embodiment.

Next, a description will be given of a function of the image processing apparatus 104 for making document files externally available.

In the image processing apparatus 104, an original scanned (read) by the scanner section 240 can be stored as a document file in the HDD 204. In this case, the controller unit 200 embeds a document ID in the document file and then stores the document file in the HDD 204, whereby the scanned original is managed as the document file associated with the document ID.

Then, the image processing apparatus 104 can make the document file managed in the HDD 204 available from an external information processing apparatus, such as the PC 101, via the LAN 106 or the WAN 222. In a case where the image processing apparatus 104 makes a document file available from an external information processing apparatus, link information is necessitated which is to be used by the external information processing apparatus so as to identify the document file stored in the image processing apparatus 104. In the present embodiment, a URL (Uniform Resource Locator) used on the Internet is utilized as link information for identifying a document file stored in the image processing apparatus 104.

Specifically, a user of an external information processing apparatus designates a document file stored in the image processing apparatus 104, using a URL in the form of "http:// (the host name of the image processing apparatus 104)/private/doc (document ID)". Assuming that a host name "somedomain.co.jp" is assigned to the image processing apparatus 104 and that a document file to be designated is assigned a document ID "1", it is necessary to use a URL in the form of "http://somedomain.co.jp/private/doc 1". Thus, the user of an external information processing apparatus can designate the document file using the above-mentioned URL form to thereby acquire a document file from the image processing apparatus 104 according to the http protocol used on the Internet.

Next, a description will be given of an image creating process (e.g. a copying process) executed by the image processing apparatus 104 shown in FIG. 3.

Figure 9:
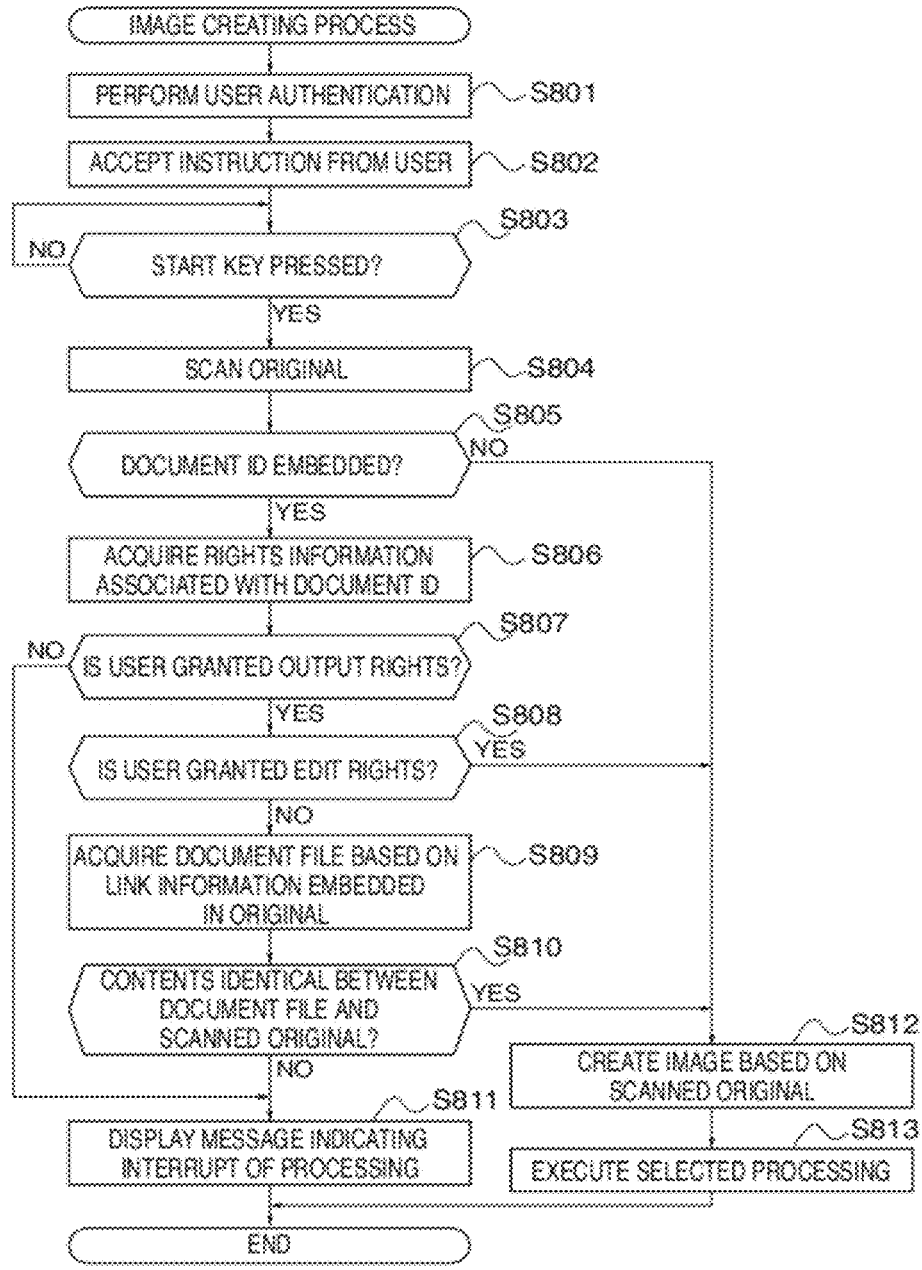
FIG. 9 is a flowchart of an image creating process that is executed by the image processing apparatus shown in FIG. 3.

FIG. 9 is a flowchart showing the image creating process that is executed by the image processing apparatus 104 shown in FIG. 3.

As shown in FIG. 9, first, the image processing apparatus 104 performs user authentication in response to an operation input received from the user via the operating unit 230 (step S801). The user inputs his/her user ID and password via the key input section 300 and the touch panel section 301 of the operating unit 230. User authentication may be performed based on authentication information input from an external device connected to the image processing apparatus 104 via the external device connection I/F 260, and any method can be employed which enables the image processing apparatus 104 to identify a user. User authentication methods using authentication information input from an external device include a method in which authentication information is acquired from a user's IC card inserted into an IC card reader connected to the external device connection I/F 260, and a method in which a fingerprint reader is connected to the external device connection I/F 260 to read a user's fingerprint.

Then, the image processing apparatus 104 accepts an operation instruction from the authenticated user (step S802). More specifically, an instruction is accepted which designates a processing operation selected by the user from the processing operations executable by the image processing apparatus 104, such as copying, document file storage (box function), and document file transmission. In the illustrated example, it is assumed that the user has selected the copying of an original and the image processing apparatus 104 has accepted an instruction for the copying operation.

Then, when the start key 401 is pressed (YES to a step S803), the image processing apparatus 104 scans (reads) the original (step S804) (original reading step), and determines whether or not the scanned original (read original) has a document ID embedded therein (step S805) (original reading step). If it is determined that the scanned original does not have a document ID embedded therein, steps S812 et seq. are executed, whereas if the scanned original has a document ID embedded therein, the process proceeds to a step S806.

In the step S806, based on the document ID embedded in an image on the scanned original and the user ID input in the step S801, the image processing apparatus 104 generates a command containing the user ID and the document ID. Then, the image processing apparatus 104 sends the generated command to the access control management server 103, and acquires rights information indicative of rights granted to the authenticated user from the access control management server 103 based on the user ID and the document ID (rights information acquisition step).

Next, the image processing apparatus 104 determines, based on the rights information acquired from the access control management server 103, whether or not the authenticated user is authorized to output the scanned original (step S807). If it is determined in the step S807 that the authenticated user is not authorized to output the scanned original, the image processing apparatus 104 judges that execution of the processing selected by the user in the step S802 is impossible, and displays a message indicating interruption of the processing on the touch panel section 301 (step S811), followed by terminating the present process.

On the other hand, if it is determined in the step S807 that the authenticated user is authorized to output the scanned original, the image processing apparatus 104 determines whether or not the authenticated user is authorized to edit the scanned original (step S808). If it is determined in the step S808 that the authenticated user is authorized to edit the scanned original, the steps S812 et seq. are executed.

On the other hand, if it is determined in the step S808 that the authenticated user is not authorized to edit the scanned original, the image processing apparatus 104 acquires a document file which is the source of the original, based on link information embedded in the scanned original (step S809) (document file acquisition step). A storage destination of the document file may be within or outside the image processing apparatus 104. It is assumed that similarly to the document ID, the link information is embedded in the original using the watermark technique.

Next, the image processing apparatus 104 determines whether or not the acquired document file and the scanned original have the same contents, to thereby determine whether or not the scanned original has its contents edited (step S810) (determination step). This determination may be performed by comparing each of the pixels of the acquired document file with a corresponding one of the pixels of the scanned original, for example. Further, a determination method can be envisaged in which it is determined, based on image data of the scanned original, whether the original is a color one or a monochrome one, and the result of the determination is compared with the color/monochrome attribute of the document file. If the result of the determination does not match the color/monochrome attribute of the document file, it can be judged that writing (i.e. editing) was performed on the original e.g. using a color marker pen. Whether the scanned original is a color original or a monochrome original can be determined by the scanner image processing section 214. Besides the above-mentioned determination methods, it is possible to envisage various other methods, such as a method in which the printing range of the document file is compared with the range of distribution of an image embedded in the scanned original, and a method in which comparison is performed between a feature amount of image data contained in the document file and a feature amount of image data of the scanned original. In short, any determination method can be used which makes it possible to determine whether or not the document file can be identified with the scanned original.

Although in the present embodiment, the document file as the source of the original is acquired in the step S809, and then it is determined whether or not the image of the document file and that of the scanned original are identical, a different method from this may be employed. For example, information on the attributes of a document file having access restriction information embedded therein may be embedded in a printout of the document file in advance by executing a printing process, described hereinafter with reference to FIG. 16, on the document file. In this case, when it can be determined, based on the document file attribute information embedded in the original, before execution of the step S809, that the original image has been edited from the original document file, the image processing apparatus 104 determines that the scanned original has its contents edited, without executing the step S809. For example, by comparing a result of determination performed based on the image data of the scanned original as to whether the original is a color original or a monochrome original, with the color/monochrome attribute embedded in the original, it is determined whether or not the scanned original has its contents edited.

Information to be embedded in a printout used as an original includes the color/monochrome attribute of a document file as the source of the original, the printing range and printing attributes of the document file, and the feature amount of image data contained in the document file, for example, but this is not limitative. When it is determined that an acquired document file is a monochrome image file and when a scanned original contains color image data, it can be judged that the original has its contents edited. In this case, the document attributes or the printing attributes of the acquired document file is searched for so as to determine that the document file is a monochrome image file.

If it is determined in the step S810 that the acquired document file and the scanned original have the same contents, the image processing apparatus 104 judges that the scanned original has not been edited from the document file as the source of the original, and creates an image based on the scanned original (step S812), and then carries out the processing selected by the user in the step S802 (step S813).

On the other hand, if it is determined in the step S810 that the acquired document file and the scanned original do not have the same contents, the image processing apparatus 104 judges that the scanned original has been edited (modified) from the document file as the source of the original. In this case, the image processing apparatus 104 judges that execution of the processing selected by the user in the step S802 is impossible, and displays the message indicating interruption of the processing on the touch panel section 301 (step S811), followed by terminating the present process.

Although in the present embodiment, as described above, whether or not to carry out processing selected by the user is determined based on whether or not the user is authorized to output and edit (whether the user has output rights and edit rights), rights information acquired from the access control management server 103 does not always contain the output rights and the edit rights. Now, a description will be given of a case where the image processing apparatus 104 which is capable of interpreting only the output rights and the edit rights acquires rights information from the access control management server 103 which is capable of setting the browsing rights, the edit rights, and the printing rights to be granted on a user-by-user basis and on a user group-by-user group basis, for each document file.

The rights information (information on the browsing rights, the edit rights, and the printing rights) that can be acquired from the access control management server 103 does not completely correspond to the rights information (information on the output rights and the edit rights) that can be interpreted by the image processing apparatus 104. For this reason, the image processing apparatus 104 derives the output rights and the edit rights interpretable by the same from the rights information acquired from the access control management server 103 in the step S806, based on a mapping table 900 shown in FIG. 10.

Figure 10:
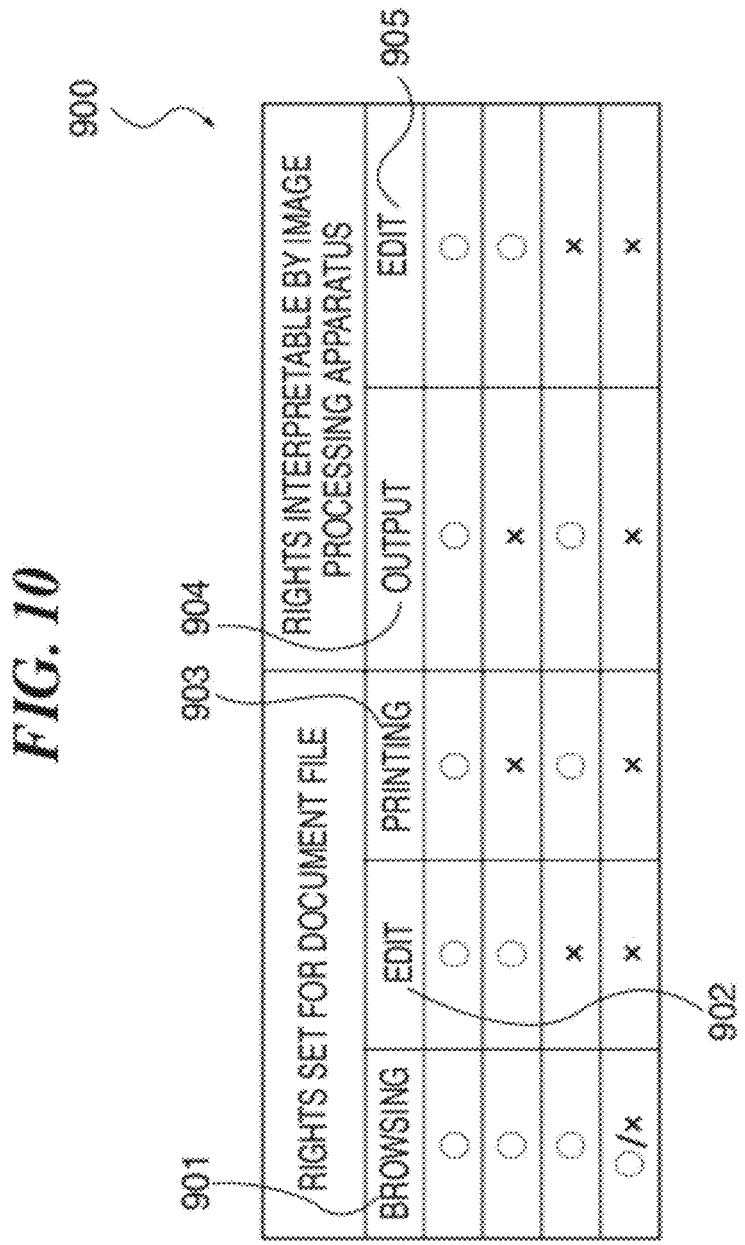
FIG. 10 is a diagram showing an example of a mapping table associating rights information acquirable from an access control management server with rights information interpretable by the image processing apparatus.

Referring to FIG. 10, browsing rights 901, edit rights 902, and printing rights 903 represent information items on rights set for a document file as the source of an original so as to be granted on a user-by-user basis and on a user group-by-user group basis. These rights information items can be acquired from the access control management server 103 by executing the step S806. On the other hand, the output rights 904 and the edit rights 905 represent items of information on rights which are interpretable by the image processing apparatus 104, and are to be handled in the steps S807 et seq. The output rights authorize users and user groups to perform printing, transmission, and other forms of output of an image. In each row of the mapping table 900, a set of the browsing rights 901, the edit rights 902, and the printing rights 903 are associated with a set of the output rights 904 and the edit rights 905. In the mapping table 900, each mark "○" indicates that the corresponding rights are granted, and each mark "x" indicates that the corresponding rights are not granted. A combination of marks "○/x" indicates that irrespective of whether or not the corresponding rights are set for the document file so as to be granted, rights interpretable by the image processing apparatus 104 are determined. For example, in a case where the edit rights 902 and the printing rights 903 are not granted, the output rights 904 and the edit rights 905 are not granted irrespective of whether or not the browsing rights 901 are granted.

For example, the mapping table 900 in FIG. 10 shows that a user who is granted all of the browsing rights 901, the edit rights 902, and the printing rights 903 is granted both the output rights 904 and the edit rights 905 in the image processing apparatus 104. Further, as shown in the mapping table 900, a user who is granted the browsing rights 901 and the edit rights 902, but not the printing rights 903 is granted the edit rights 905, but not the output rights 904.

In a case where the mapping table 900 is used by the image processing apparatus 104, the mapping table 900 is provided in advance in a form processable by some means. Specifically, the mapping table 900 may be stored in the HDD 204 or the ROM 203 within the image processing apparatus 104, or may be configured such that it can be acquired from an external apparatus through the LAN 106 or the WAN 222. The image processing apparatus 104 may be configured such that a user (administrator) who is granted special edit rights can edit the mapping table 900. In this case, the image processing apparatus 104 causes the touch panel section 301 to display a screen for use in configuring or editing the mapping table 900, so as to allow the user to edit the same.

Now, a description will be given of a case where the FIG. 9 process is executed using the mapping table 900.

First, the image processing apparatus 104 executes the steps S801 to S805 in FIG. 9. Next, the image processing apparatus 104 acquires the browsing rights 901, the edit rights 902, and the printing rights 903 as rights information from the access control management server 103 in the step S806, and then acquires rights usable for the processing in the steps S807 et seq., using the mapping table 900, whereafter the steps S807 et seq. are continuously executed.

The mapping table 900 is varied according to the kinds of rights acquirable from the access control management server 103 and the kinds of rights interpretable by the image processing apparatus 104. However, in the present embodiment, insofar as some correspondence can be established, specific rights which can be handled by the access control management server 103 and specific rights which can be handled by the image processing apparatus 104 are not limited.

Next, an access control process that is executed by the access control management server 103 appearing in FIG. 1 will be described with reference to FIGS. 11 to 15.

Figure 11:
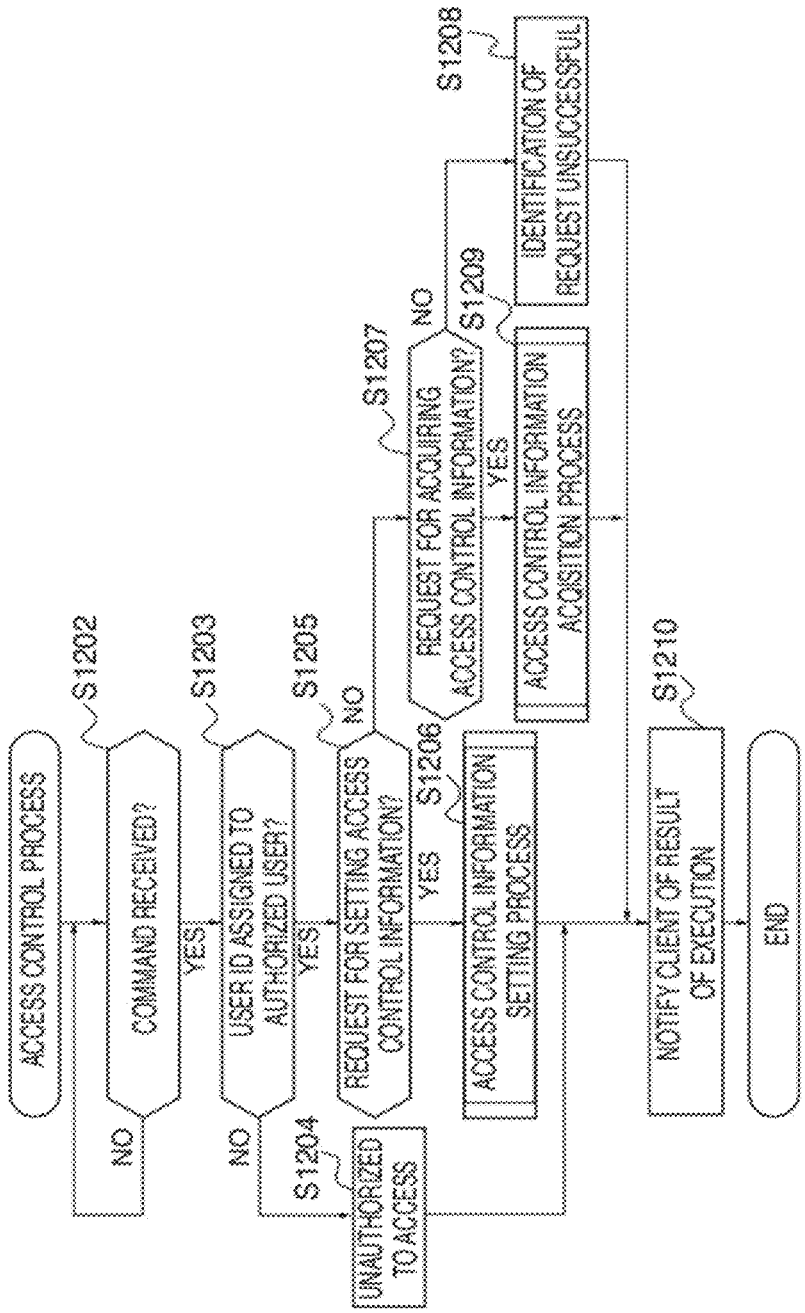
FIG. 11 is a flowchart of an access control process that is executed by the access control management server appearing in FIG. 1.

FIG. 11 is a flowchart of the access control process executed by the access control management server 103 appearing in FIG. 1.

Referring to FIG. 11, first, an access control application is started by the access control management server 103, and it is determined whether or not a command, described hereinafter with reference to FIG. 12, has been received from a client, such as the image processing apparatus 104 or the PC 101 or 102 (step S1202). If the command has been received, the process proceeds to a step S1203.

A client, such as the image processing apparatus 104 or the PC 101, can send commands to the access control management server 103 by various methods. For example, the access control application operates as a WEB application to provide a predetermined screen on a WEB browser of the client. By the user inputting a command via the screen on the WEB browser, the client can send the command to the access control management server 103. Further, when the user causes the client to display a document having access control information set therefor, the WEB application is started, and a command containing a request for acquisition of access control information is automatically generated and sent to the access control management server 103. This makes it possible to check whether or not the user is permitted to display the document file.

Figure 12:
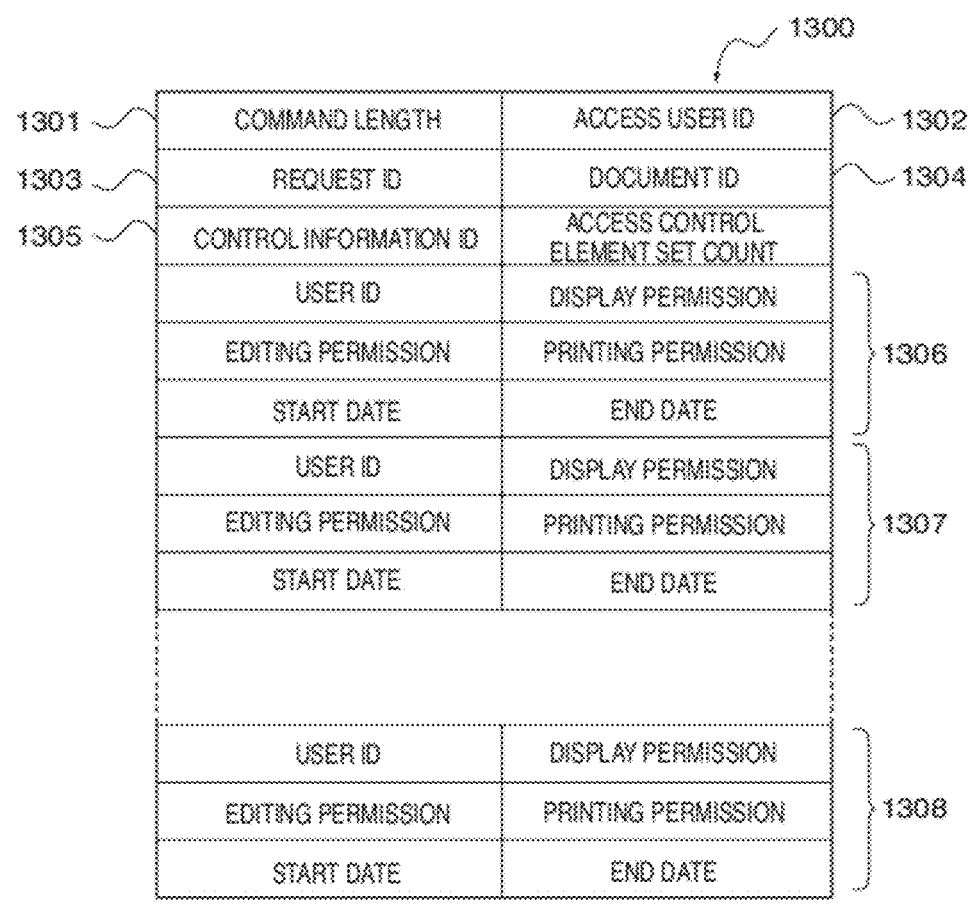
FIG. 12 is a diagram showing an example of a command which the access control management server receives from a client, such as the image processing apparatus or one of the PCs appearing in FIG. 1.

FIG. 12 is a diagram showing an example of the command which the access control management server 103 receives from a client, such as the image processing apparatus 104 or the PC 101 or 102 appearing in FIG. 1.

Referring to FIG. 12, a command length 1301 represents the size of the command 1300. An access user ID 1302 is for identifying a user who accesses the access control management server 103. A request ID 1303 is for designating one of a request for setting access control information for restricting user access to a designated document file and a request for acquisition of the access control information. The document ID 1304 is embedded in the command 1300 for identifying the document file as the source of the original, as described hereinabove.

A control information ID 1305 is for identifying access control information for restricting user access to the document file. The control information ID 1305 is assigned only to a document file requiring access control. Access control elements (1) 1306, access control elements (2) 1307, . . . , access control elements (n) 1308 store respective user-specific access information items constituting each item of access control information. One set of access control elements includes, for example, display permission, editing permission, printing permission, and an expiration date (end date).

Referring again to FIG. 11, in a step S1203, the received command is analyzed, whereby it is determined whether or not the user ID contained in the command is assigned to an authorized user. If it is determined in the step S1203 that the user ID is not an authorized user's, it is judged that the command is from a user who is not granted access rights (step S1204), and the client having transmitted the command is notified of the result of the execution of the process (step S1210), followed by terminating the present process.

Figure 15:
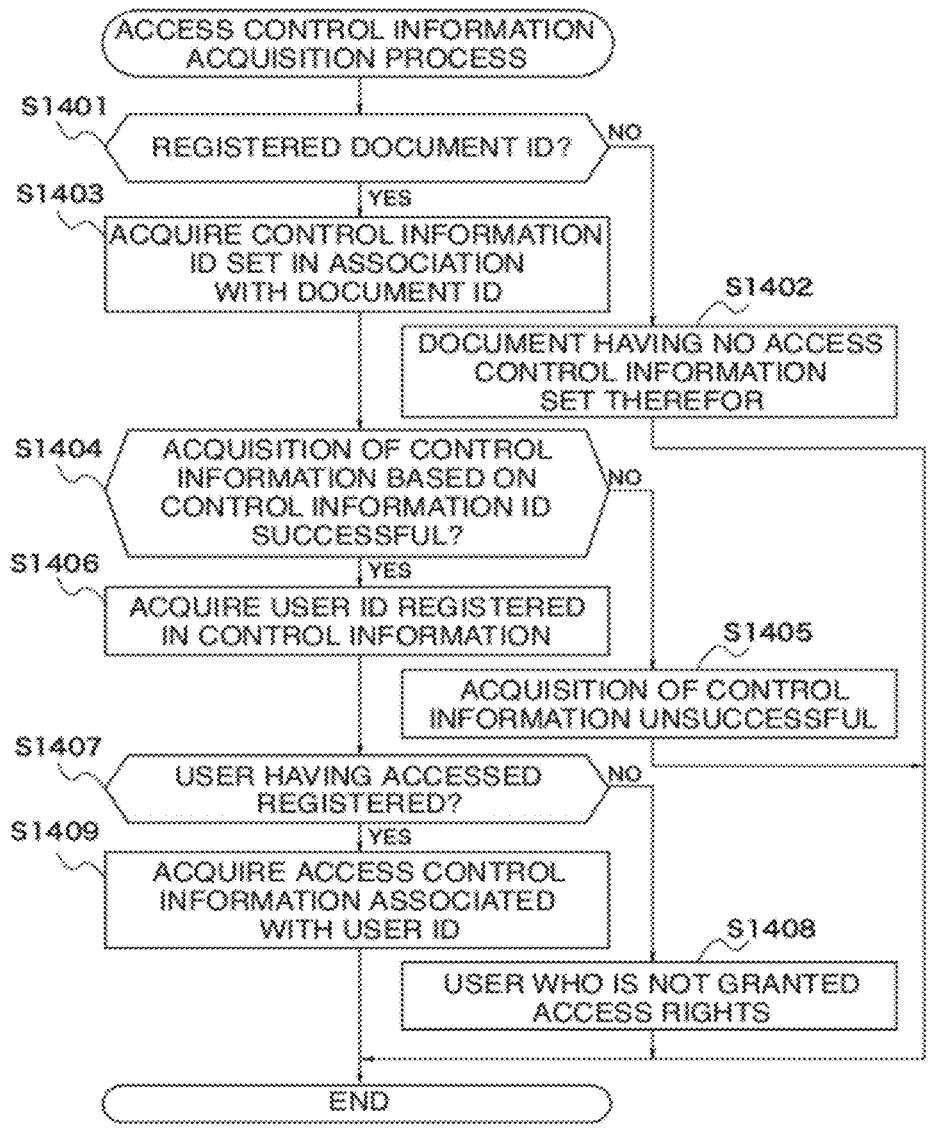
FIG. 15 is a flowchart of an access control information acquisition process that is carried out in a step S1209 in FIG. 11.

On the other hand, if it is determined in the step S1203 that the user ID contained in the command is assigned to an authorized user, it is checked whether the request ID 1303 designates the request for setting the access control information (step S1205). If it is determined in the step S1205 that the request ID 1303 designates the request for setting the access control information, an access control information setting process, described hereinafter with reference to FIG. 15, is executed to set the access control information (step S1206), and notifies the client of the result of the execution of the process (step S1210), followed by terminating the present process.

On the other hand, if it is determined in the step S1205 that the request ID 1303 contained in the command does not designate the request for setting the access control information, it is determined whether or not the request ID 1303 designates the request for acquisition of the access control information (step S1207). If it is determined in the step S1207 that the request ID 1303 does not designate the request for acquisition of the access control information, the access control management server 103 judges that identification of the request received from the client is unsuccessful (step S1208), and notifies the client of the result of the execution of the process (step S1210), followed by terminating the present process.

Figure 16:
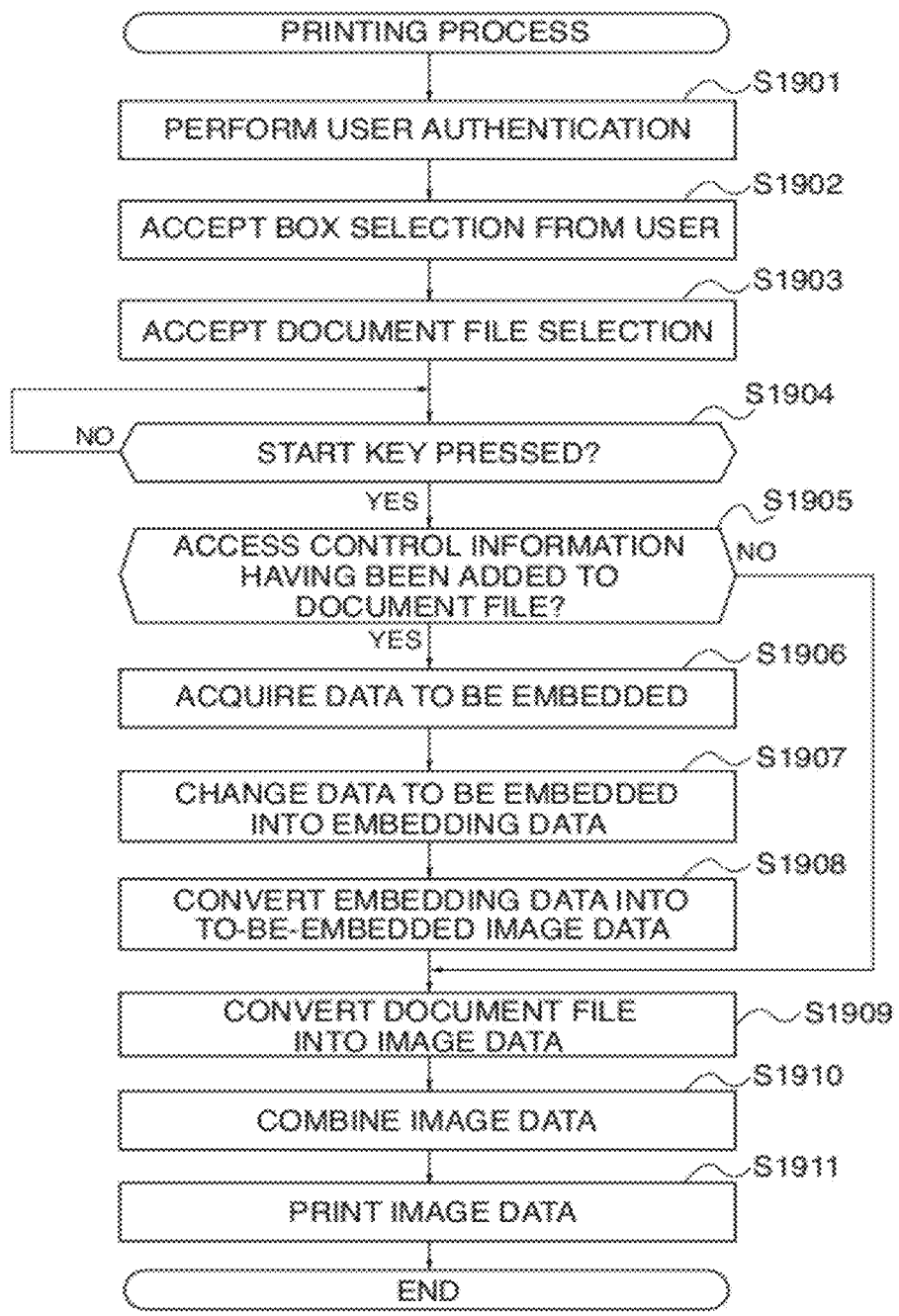
FIG. 16 is a flowchart of a printing process executed by the image processing apparatus shown in FIG. 3, for printing a document file having access control information added thereto.

On the other hand, if it is determined in the step S1207 that the request ID 1303 contained in the command designates the request for acquisition of the access control information, an access control information acquisition process, described hereinafter with reference to FIG. 16, is executed to acquire the access control information (step S1209), and notifies the client of the result of the execution of the process (step S1210), followed by terminating the present process. The step S1210 includes e.g. sending the access control information acquired in the step S1209 to the client.

Figure 13A:
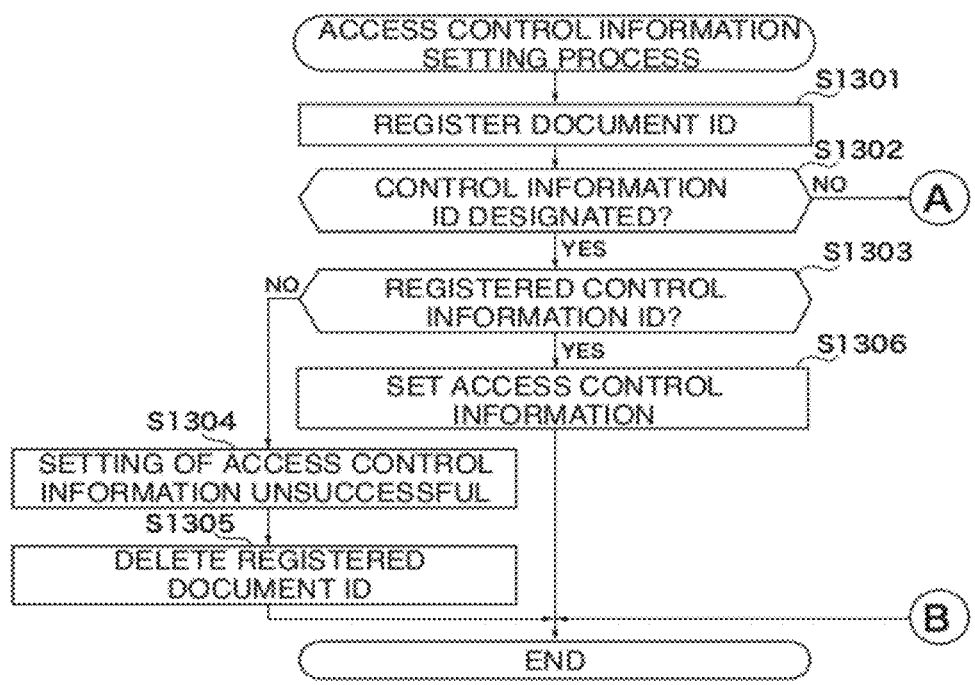
FIGS. 13A and 13B are flowcharts of an access control information setting process that is carried out in a step S1206 in FIG. 11.
Figure 13B:
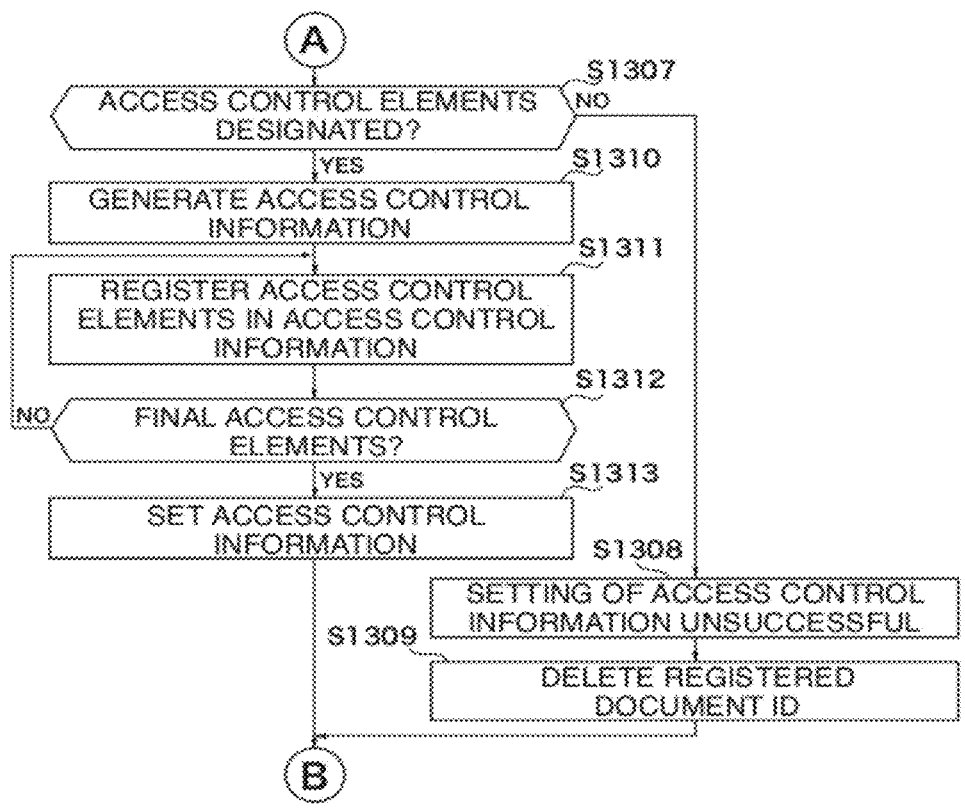

FIGS. 13A and 13B are flowcharts of the access control information setting process that is carried out in the step S1206 in FIG. 11.

The present process is executed so as to set designated access control information for a document ID designated by the command.

Referring to FIG. 13A, first, the document ID designated by the command received from the client, such as the image processing apparatus 104 or the PC 101 or 102, is registered in an access management table 1201 shown in FIG. 14A (step S1301). The access management table 1201 contains table information associating document IDs and control information IDs, and is stored in the access control management server 103.

Then, it is determined whether or not a control information ID is designated by the received command (step S1302). If a control information ID is designated, an access control information table 1202 shown in FIG. 14B is searched for the designated control information ID, whereby it is determined whether or not the designated control information ID has been registered (step S1303). The access control information table 1202 contains table information defining user IDs, rights information, and expiration dates associated with respective control information IDs, and is stored in the access control management server 103.

If it is determined in the step S1303 that the designated control information ID has not been registered, the access control application judges that setting of the access control information is unsuccessful (step S1304), and deletes the registered document ID from the access management table 1201 (step S1305), followed by terminating the present process.

On the other hand, if it is determined in the step S1303 that the designated control information ID has been registered, the designated control information ID is registered in the access management table 1201 in association with the designated document ID, and the access control information is set (step S1306), followed by terminating the present process.

If it is determined in the step S1302 that the received command does not designate a control information ID, it is determined in a step S1307 whether or not a set of access control elements is designated by the command (step S1307). If the command does not designate a set of access control elements, the access control application judges that setting of the access control information is unsuccessful (step S1308), and deletes the registered document ID from the access management table 1201 (step S1309), followed by terminating the present process.

On the other hand, if it is determined in the step S1307 that the received command designates a set of access control elements, a control information ID is generated and registered in the access control information table 1202, whereby an item of access control information is generated (step S1310). Then, a user ID, whether or not to permit execution of associated operations, and an associated expiration date, which are specified by the access control elements, are registered in the generated item of access control information (step S1311).

Next, if the set of access control elements is not a final one of all the sets of access control elements designated by the command (NO to a step S1312), the process returns to the step S1311, whereas if the set of access control elements is a final one of all the sets of access control elements designated by the command (YES to a step S1312), the generated control information ID is registered in the access management table 1201, in association with the designated document ID, and the access control information is set (step S1313), followed by terminating the present process.

FIG. 15 is a flowchart showing the procedure of the access control information acquisition process that is carried out in the step S1209 in FIG. 11.

The present process is executed so as to acquire the access control information set in association with the document ID designated by the command.

Referring to FIG. 15, first, it is determined whether or not the document ID designated by the received command has been registered in the access management table 1201 (step S1401). If the document ID has not been registered, it is judged that the document file assigned the document ID has not access control information set therefor (step S1402), followed by terminating the present process.

On the other hand, if it is determined in the step S1401 that the document ID has been registered, the control information ID set in association with the document ID is acquired from the access management table 1201 (step S1403). Then, it is determined, based on the acquired control information ID and the access control information table 1202, whether or not acquisition of access control information is successful (step S1404). If acquisition of access control information is not successful, it is judged that acquisition of access control information is unsuccessful (step S1405), followed by the process returning to the access control process in FIG. 11.

On the other hand, if it is determined in the step S1404 that acquisition of access control information is successful, the user ID registered in the access control information is acquired from the access control information table 1202 (step S1406). Then, it is determined, based on the user ID contained in the command and the user ID acquired in the step S1406, whether or not the user having accessed the access control management server 103 has been registered (step S1407). If the user has not been registered, it is judged that the user is not granted the access rights for access to the document file (step S1408), followed by terminating the present process.

On the other hand, if it is determined in the step S1407 that the user having accessed the access control management server 103 has been registered, an item of access control information containing user's rights information on operations the user is authorized to perform is acquired from the access control information table 1202 (step S1409), followed by terminating the present process.

Next, a printing process executed by the image processing apparatus 104, for printing a document file having access control information added thereto will be described with reference to FIG. 16.

FIG. 16 is a flowchart of the printing process that is executed by the image processing apparatus 104, for printing a document file having access control information added thereto.

In the present embodiment, it is assumed that a document file to be printed is stored in a box of the image processing apparatus 104, but a document file to be printed may be acquired from an external apparatus and then subjected to printing by the image processing apparatus 104. Further, any suitable method can be employed for acquisition of a document file to be printed.

First, the image processing apparatus 104 performs user authentication based on an input e.g. from the operating section 230 (step S1901). The user inputs his/her user ID and password e.g. via the key input section 300 and the touch panel section 301 of the operating section 230. The user authentication is performed in the same way as in the step S801 in FIG. 9.

Then, when the authenticated user presses the box tab 503 so as to browse a box storing document files including a document file to be printed, the image processing apparatus 104 accepts selection of the box from the user (step S1902). Then, when the user selects the document file, the image processing apparatus 104 accepts selection of the document file (step S1903). If the start key 401 is pressed (YES to a step S1904) after selection of the document file, the image processing apparatus 104 determines whether or not the document file selected by the user has access control information added thereto (step S1905).

If it is determined in the step S1905 that the document file has access control information added thereto, data to be embedded is acquired from the ROM 203 or the HDD 204 based on a document ID and link information embedded in the document file (step S1906). The link information is provided for identifying the document file, as described hereinabove, and a URL for making the document file externally available is used as the link information, for example. Information to be embedded in the document file in addition to the document ID and the link information includes a resolution of the document file selected by the user, information on whether the document is a color document or a monochrome document, like other display attributes, and printing attributes.

In a step S1907, the data to be embedded which is acquired in the step S1906 is converted into embedding data. More specifically, the data to be embedded is converted into a data format that allows conversion into image data in the steps S1907 et seq. As the data format, any data format may be employed insofar as it allows conversion into image data in the steps S1907 et seq. As the data format, there may be mentioned XML (Extensible Markup Language) and CSV (Comma Separated Values), for example. FIG. 17 shows an example of a case where the XML format is used.

In a step S1908, the embedding data obtained by the conversion in the step S1907 is interpreted and converted into to-be-embedded image data, which is then stored in the RAM 202 or the HDD 204. This processing is carried out by an arbitrary kind of watermark image forming method conventionally known, and hence description thereof is omitted.

In the following step S1909, the image processing apparatus 104 converts the document file selected by the user into image data using the CPU 201, the RIP 212, the printer image processing section 215, and so forth, and stores the image data in the RAM 202 or the HDD 204. Thereafter, the to-be-embedded image data obtained in the step S1908 and the image data obtained by conversion in the step S1909 are combined (step S1910). Then, the obtained image data is sent to the printer section 250 for printing (step S1911), followed by terminating the present process.

If it is determined in the step S1905 that the document file has no access control information added thereto, the steps S1906 to S1908 are skipped, and the steps S1909 et seq. are executed, followed by terminating the present process.

According to the FIG. 9 process, an original having a document ID and link information embedded therein is scanned, and rights information indicative of rights granted to a user who intends to use the image processing apparatus 104 is acquired based on the document ID and the link information (step S806). Then, based on the acquired rights information, it is determined whether or not the user is authorized to output and edit the scanned original (steps S807 and S808). If the user is authorized to output the scanned original (YES to the step S807), but not authorized to edit the same (NO to the step S808), a document file as the source of the scanned original is acquired based on the link information (step S809). Then, the acquired document file is compared with the scanned original (step S810), and only when the original has not been edited (YES to the step S810), processing selected by the user is executed (step S813). Thus, in a case where the user causes the image processing apparatus to read an original and perform predetermined processing, it is possible to easily determine whether or not the original has been modified or edited from the document file as the source of the original, to thereby improve security.

Figure 18:
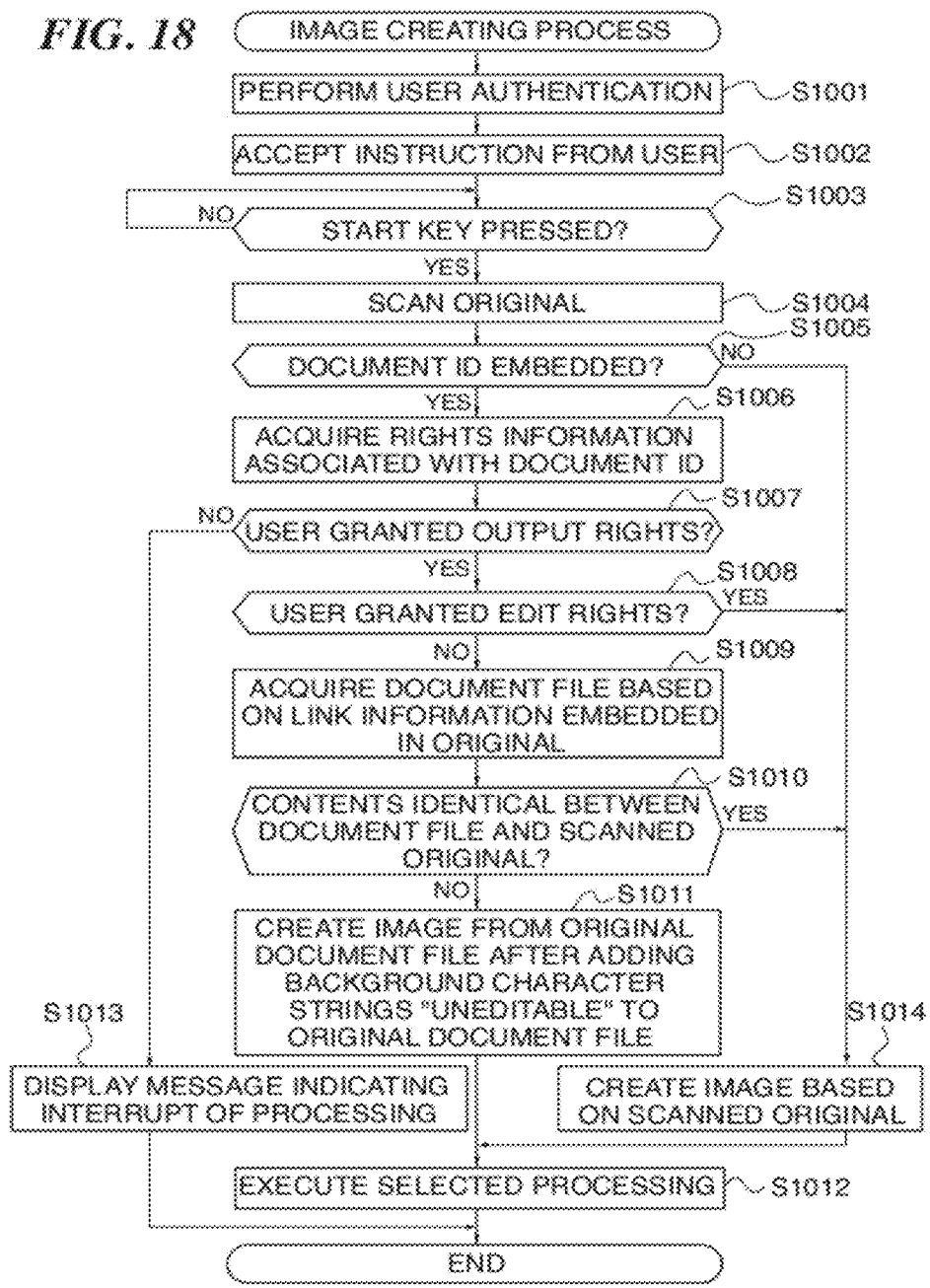
FIG. 18 is a flowchart of another image creating process that is executed by the image processing apparatus shown in FIG. 3.

FIG. 18 is a flowchart of another image creating process that is executed by the image processing apparatus 104 shown in FIG. 3.

First, the image processing apparatus 104 performs user authentication in response to an operation input received from the user via the operating unit 230 (step S1001). The user inputs his/her user ID and password via the key input section 300 and the touch panel section 301 of the operating unit 230. User authentication may be performed based on authentication information input from an external device connected to the image processing apparatus 104 via the external device connection I/F 260, and any method can be employed which enables the image processing apparatus 104 to identify a user. User authentication methods using authentication information input from an external device include a method in which authentication information is acquired from a user's IC card inserted into an IC card reader connected to the external device connection I/F 260, and a method in which a fingerprint reader is connected to the external device connection I/F 260 to read a user's fingerprint.

Then, the image processing apparatus 104 accepts an operation instruction from the authenticated user (step S1002). More specifically, an instruction is accepted which designates a processing operation selected by the user from the processing operations executable by the image processing apparatus 104, such as copying, document file storage, and document file transmission. In the illustrated example, it is assumed that the user has selected the copying of an original and the image processing apparatus 104 has accepted an instruction for the copying operation.

Then, when the start key 401 is pressed (YES to a step S1003), the image processing apparatus 104 scans the original (step S1004), and determines whether or not the scanned original has a document ID embedded therein (step S1005). If it is determined that the scanned original does not have a document ID embedded therein, the process proceeds to a step S1014, wherein an image is created based on the scanned original. Then, the processing selected in the step S1002 is executed (step S1012).

On the other hand, if it is determined in the step S1005 that the scanned original has a document ID embedded therein, the image processing apparatus 104 acquires rights information on rights granted to the authenticated user, based on the document ID and the user ID, similarly to the step S806 in FIG. 9. Then, the image processing apparatus 104 determines, based on the acquired rights information, whether or not the authenticated user is authorized to output the scanned original (step S1007). If it is determined that the authenticated user is not authorized to output the scanned original, the image processing apparatus 104 judges that execution of the processing selected by the user is impossible, and displays a message indicating interruption of the processing on the touch panel section 301 (step S1013), followed by terminating the present process.

On the other hand, if it is determined in the step S1007 that the authenticated user is authorized to output the scanned original, the image processing apparatus 104 determines whether or not the authenticated user is authorized to edit the scanned original (step S1008). If it is determined in the step S1008 that the authenticated user is authorized to edit the scanned original, the image processing apparatus 104 creates an image based on the scanned original (step S1014), and executes the processing selected by the user (step S1012), followed by terminating the present process.

On the other hand, if it is determined in the step S1008 that the authenticated user is not authorized to edit the scanned original, the image processing apparatus 104 acquires a document file as the source of the original, based on link information embedded in the scanned original (step S1009). A storage destination of the document file may be within the image processing apparatus or outside the same.

Next, the image processing apparatus 104 determines whether or not the acquired document file and the scanned original have the same contents (step S1010). This determination may be performed by comparing each of the pixels of the acquired document file with a corresponding one of the pixels of the scanned original, for example. Further, various other determination methods can be envisaged, including a method in which the color/monochrome attribute of the document file as the source of the original is compared with information on printing attributes which is embedded in the scanned original. As for a method of determining whether or not the acquired document file and the scanned original have the same contents, any suitable method may be employed insofar as it is possible to determine whether or not the document file can be identified with the scanned original.

Further, if it is possible to embed information on the attributes of a document file as the source of an original in the original, as in the above-described example, and determine, based on the information, whether or not the scanned original has its contents edited, the information may be used as a criteria for determination. Further, if it is determined that an acquired document file is a monochrome image file and at the same time a scanned original contains color image data, it can be judged that the original has its contents edited. In this case, the acquired document file is searched for the document attributes or the printing attributes so as to determine that the document file is a monochrome image file.

If it is determined in the step S1010 that the acquired document file and the scanned original have the same contents, the image processing apparatus 104 judges that the scanned original has not been edited from the document file as the source of the original, and creates an image based on the scanned original (step S1014). Further, the image processing apparatus 104 carries out the processing selected by the user (step S1012), followed by terminating the present process.

Figure 19:
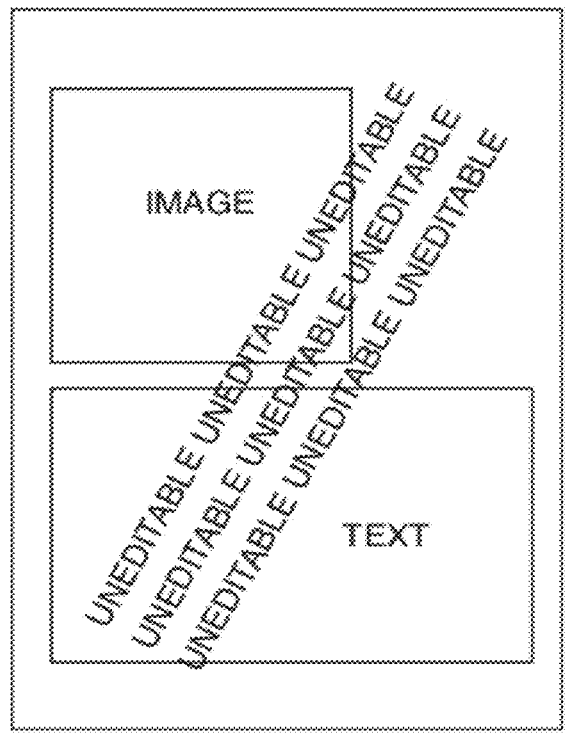
FIG. 19 is a view showing an example of a printout obtained by printing a document file as the source of an original after background character strings "uneditable" are added thereto.

On the other hand, if it is determined in the step S1010 that the acquired document file and the scanned original do not have the same contents, the image processing apparatus 104 judges that the scanned original has been edited from the document file as the source of the original. Then, the image processing apparatus 104 adds background character strings "uneditable" to the original document file, and then creates an image based on the document file (step S1011). Further, the image processing apparatus 104 carries out the processing selected by the user (step S1012), followed by terminating the present process. FIG. 19 shows an example of a printout obtained by printing the original document file after the background character strings "uneditable" are added thereto.

In the FIG. 18 process, when it is determined that the scanned original has been edited from the original document file, the background character strings are added to the original document file in the step S1011. However, this is not limitative, but processing that can be executed when it is determined that the scanned original has not been edited and processing that can be executed when it is determined that the scanned original has been edited may be defined respectively (definition unit), and one of the two types of processing may be selectively carried out according to whether or not the user is authorized to output and edit the scanned original (steps S1007 and S1008).

Further, similarly to the FIG. 9 process, in the FIG. 18 process as well, mapping of rights may be performed so as to derive rights interpretable by the image processing apparatus 104.

According to the FIG. 18 process, an original having a document ID and link information embedded therein is scanned, and rights information indicative of rights granted to a user who intends to use the image processing apparatus 104 is acquired based on the document ID and the link information (step S1006). Then, based on the acquired rights information, it is determined whether or not the user is authorized to output and edit the scanned original (steps S1007 and S1008). If the user is authorized to output the scanned original (YES to the step S1007), but not authorized to edit the same (NO to the step S1008), a document file as the source of the scanned original is acquired based on the link information (step S1009). Then, the acquired document file is compared with the scanned original (step S1010), and according to the result of determination as to whether or not the scanned original has been edited, predetermined processing is executed (step S1011 or S1014). This makes it possible to easily determine, when the user causes the image processing apparatus to scan an original to carry out predetermined processing, whether or not the original has been modified or edited from a document file as the source of the original, to thereby improve security.

It is to be understood that the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, optical disks, such as a CD-ROM, a CD-R, a CD-RW, a DVD-ROM, a DVD-RAM, a DVD-RW, and a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Further, it is to be understood that the functions of the above-described embodiment may be accomplished not only by executing the program code read out by a computer, but also by causing an OS or the like which operates on the computer to perform a part or all of the actual operations based on instructions of the program code. In this case, the program code is supplied from a storage medium in which the program code is stored, or is supplied by downloading directly from another computer, a database, or the like, not shown, connected to the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-258694 filed Oct. 2, 2007, which is hereby incorporated by reference herein in its entirety.

What is claimed is:

1. An image processing apparatus comprising:
   an original reading unit configured to read an original;
   a rights information acquisition unit configured to acquire rights information concerning the original based on information embedded in the original;
   a determination unit configured to determine, based on the rights information, whether or not a user is authorized to output and modify the original;
   a document file acquisition unit configured to acquire a document file associated with the original based on the information embedded in the original, when it is determined that the user is authorized to output the original, but not authorized to modify the original;
   a judgment unit configured to judge whether or not the original has been modified by performing a comparison between the acquired document file and image data of the original; and
   a control unit configured to allow original image data to be generated based on the original when it is judged that the original has been modified and the rights information indicates that the original is allowed to be modified, but to restrict original image data from being generated based on the original when it is judged that the original has been modified and the rights information indicates that the original is not allowed to be modified.

2. The image processing apparatus according to claim 1, further comprising an authentication unit configured to authenticate the user,
   wherein the original reading unit reads a document ID that makes the document file identifiable and link information for locating the document file, as the information embedded in the original,
   wherein the rights information acquisition unit acquires the rights information based on the read document ID and authentication information of the user, which is acquired by the authentication unit,
   wherein the judgment unit judges that the original has been modified, when the acquired document file and the read original do not have identical contents, and
   wherein the document file acquisition unit acquires the document file based on the link information.

3. The image processing apparatus according to claim 2, further comprising a communication unit configured to communicate with an information processing apparatus via a network,
   wherein the authentication unit is connected to the information processing apparatus by the communication unit to perform authentication, and the document file acquisition unit acquires the document file from one of the image processing apparatus and the information processing apparatus via the communication unit.

4. The image processing apparatus according to claim 1, wherein the original reading unit reads information on attributes of the document file as the information embedded in the original, and
   wherein the judgment unit judges, based on the information on the attributes of the document file, whether or not the acquired document file and the read original have identical contents.

5. The image processing apparatus according to claim 4, wherein, when it is judged, based on the information on the attributes of the document file, that the read original has been modified, the judgment unit judges that the read original has been modified, without using the document file.

6. The image processing apparatus according to claim 4, wherein the information on the attributes of the document file contains at least one of a printing attribute, a printing range, and an image feature amount of the document file, and the judgment unit performs judgment based on at least one of the printing attribute, the printing range, and the image feature amount.

7. The image processing apparatus according to claim 1, wherein, when the document file acquired by the document file acquisition unit is a monochrome image file, and when the original image data of the original read by the original reading unit is color image data, the judgment unit judges that the original has been modified.

8. The image processing apparatus according to claim 7, wherein the judgment unit searches for a document attribute and a printing attribute of the document file so as to judge that the acquired document file is a monochrome image file.

9. The image processing apparatus according to claim 1, wherein the original reading unit is capable of reading information which is visibly or invisibly embedded.

10. A control method for an image processing apparatus, the control method comprising:
    using a processor to perform the steps of:
       reading an original;
       acquiring rights information concerning the original based on information embedded in the original;
       determining, based on the rights information, whether or not a user is authorized to output and modify the original;
       acquiring a document file associated with the original based on the information embedded in the original, when it is determined that the user is authorized to output the original, but not authorized to modify the original;
       judging whether or not the original has been modified by performing a comparison between the acquired document file and image data of the original; and
       performing control by allowing original image data to be generated based on the original when it is judged that the original has been modified and the rights information indicates that the original is allowed to be modified, and restricting original image data from being generated based on the original when it is judged that the original has been modified and the rights information indicates that the original is not allowed to be modified.

11. A non-transitory computer-readable storage medium storing a program for causing a computer to execute a control method for an image processing apparatus, wherein the control method comprises:
  reading an original;
  acquiring rights information concerning the original based on information embedded in the original;
  determining, based on the rights information, whether or not a user is authorized to output and modify the original;
  acquiring a document file associated with the original based on the information embedded in the original, when it is determined that the user is authorized to output the original, but not authorized to modify the original;
  judging whether or not the original has been modified by performing a comparison between the acquired document file and image data of the original; and
  performing control by allowing original image data to be generated based on the original when it is judged that the original has been modified and the rights information indicates that the original is allowed to be modified, and restricting original image data from being generated based on the original when it is judged that the original has been modified and the rights information indicates that the original is not allowed to be modified.

* * * * *